US007077750B1

(12) United States Patent
Nakamura

(10) Patent No.: US 7,077,750 B1
(45) **Date of Patent: *Jul. 18, 2006**

(54) MULTI DIRECTIONAL INPUT APPARATUS

(75) Inventor: Masahiko Nakamura, Yao (JP)

(73) Assignee: Hosiden Corporation, Yao (JP)

( * ) Notice: Subject to any disclaimer, the term of this patent is extended or adjusted under 35 U.S.C. 154(b) by 485 days.

This patent is subject to a terminal disclaimer.

(21) Appl. No.: 09/807,183

(22) PCT Filed: Aug. 10, 2000

(86) PCT No.: PCT/JP00/05359

§ 371 (c)(1),
(2), (4) Date: Apr. 10, 2001

(87) PCT Pub. No.: WO01/13194

PCT Pub. Date: Feb. 22, 2001

(30) Foreign Application Priority Data

Oct. 8, 1999 (JP) .......................................... 11-226987

(51) Int. Cl.
*A63F 13/00* (2006.01)

(52) U.S. Cl. ......................................................... 463/36

(58) Field of Classification Search ............. 463/36–38; 74/471 XY; 341/20; 200/6 R, 6 A, 16 C, 200/51 LM; 345/161
See application file for complete search history.

(56) References Cited

U.S. PATENT DOCUMENTS

| | | | | |
|---|---|---|---|---|
| 4,469,330 A | * | 9/1984 | Asher | 463/38 |
| 4,492,830 A | * | 1/1985 | Kim | 200/6 A |

(Continued)

FOREIGN PATENT DOCUMENTS

| | | | |
|---|---|---|---|
| EP | 0 867 212 A | | 9/1998 |
| JP | 01-222606 | | 9/1989 |
| JP | 08-123614 | | 5/1996 |
| JP | 08-221129 | * | 8/1996 |
| JP | 08-227316 | * | 9/1996 |
| JP | 9-134251 | | 5/1997 |
| JP | 10-049292 | | 2/1998 |
| JP | 10-105269 | * | 4/1998 |
| JP | 10-207565 | * | 8/1998 |
| JP | 10-240438 | * | 9/1998 |
| JP | 10-283885 | | 10/1998 |
| JP | 11-273509 | * | 10/1999 |
| JP | 11-339603 | * | 12/1999 |

OTHER PUBLICATIONS

Patent Abstracts of Japan, vol. 1999, No. 08, Jun. 30, 1999 & JP 11 073853A, Mar. 16, 1999 * Abstract *.

Patent Abstracts of Japan, vol. 018, No. 391, Jul. 21, 1994 & JP 06 110602A, Apr. 22, 1994 * Abstract *.

*Primary Examiner*—John M. Hotaling, II
(74) *Attorney, Agent, or Firm*—Armstrong, Kratz, Quintos, Hanson & Brooks, LLP

(57) ABSTRACT

A multidirectional input apparatus having an operating member 30 integrally provided with turning shafts 35 and 35 projecting in two intersecting directions. A disc 32 is provided below the turning shafts 35 and 35. The turning member 40B is provided at its lower surface with a recess 46B which accommodates therein the disc 32 such that disc 32 can turn. The recess 46B is provided at its inner surface with bearings 47B and 47B into which the turning shafts 35 and 35 are fitted. The turning members 40A and 40B are provided at opposite end shafts thereof with flat surfaces 44A and 44B. An annular slider 50 biased by a spring 60 is brought into resilient abutment against the flat surfaces 44A and 44B of the turning members 40A and 40B from below.

13 Claims, 23 Drawing Sheets

U.S. PATENT DOCUMENTS 4,926,172 A * 5/1990 Gorsek ........................ 341/20
5,473,325 A * 12/1995 McAlindon .................. 341/20
6,002,351 A * 12/1999 Takeda et al. ................ 341/20
6,004,134 A * 12/1999 Marcus et al. ................ 434/45
6,059,660 A * 5/2000 Takada et al. ................ 463/38
6,078,247 A * 6/2000 Shimomura ................. 338/131
6,186,896 B1 * 2/2001 Takeda et al. ................ 463/38
6,259,433 B1 * 7/2001 Meyers ....................... 345/161
6,344,620 B1 * 2/2002 Nakamura .................. 200/6 A
6,353,430 B1 * 3/2002 Cheng et al. ............... 345/161
6,462,731 B1 * 10/2002 Stoffers et al. ............. 345/161

* cited by examiner

A – A

MULTI DIRECTIONAL INPUT APPARATUS

FIELD OF THE INVENTION

The present invention relates to a multi-directional input apparatus for inputting various signals by operating an operating member which is operated in arbitrary direction therearound.

BACKGROUND ART

A multi-directional input apparatus of this type called joystick is usually supported in a case such that the apparatus can be turned in two directions perpendicular to each other, and comprises a set of upper and lower turning members having long holes each extending in a direction perpendicular to the turning direction, an operating member passing through the long holes of the set of upper and lower turning members for turning the turning members by operating the operating member in an arbitrary circumferential direction, a spring compressed and accommodated in the case for resiliently holding the operating member in its neutral position, a returning mechanism for automatically returning the operating member from a position where the operating member is operated in an arbitrary direction therearound to a neutral position, and a set of signal output means for outputting a signal corresponding to the turning angle of each the turning member.

In such a multi-directional input apparatus, in order prevent the operating member from being pulled out, a lower portion of the operating member is supported by a lower turning member such that the operating member can turn in a direction of the long hole. As a pivotally supporting mechanism of the operating member, in a multi-directional input apparatus described in each of Japanese Utility Model Publication Nos. H5-19925, H7-27608 and Japanese Patent Application Laid-Open No.H10-283885, for example, a lower portion of the operating member is connected to a lower turning member by means of a pin directed to a direction perpendicular to the long hole. With this structure, the operating member is turned in the direction of the long hole of the lower turning member, thereby turning the upper turning member. Further, the operating member is turned together with the lower turning member in the direction of the long hole of the upper turning member, thereby turning the lower turning member.

As the returning mechanism for automatically returning the operating member from a position where the operating member is operated in an arbitrary direction therearound to a neutral position, a multi-directional input apparatus described in Japanese Utility Model Publication No. H5-19925 employs a structure in which a push up member biased upward by a spring resiliently hold the set of upper and lower turning members at the neutral position.

Further, a multi-directional input apparatus described in each of Japanese Utility Model Publication Nos. H7-27608 and Japanese Patent Application Laid-Open No.H10-283885 employs a structure, as the returning mechanism, in which a pan-like operating body provided on a lower end of the operating member is resiliently pressed upward by means of a spring provided below the operating body, thereby resiliently holding only the operating member at the neutral position.

However, these conventional multi-directional input apparatuses have the following problems relating the pivotally supporting mechanism of the operating member and the returning mechanism.

In any of these multi-directional input apparatuses, since an intermediate portion of the operating member is connected to the lower turning member by means of the pin, the number of parts is increased. Further, the entire length of the operating member is increased, and it is difficult to reduce the apparatus in size and height.

Concerning the returning mechanism for returning the operating member to the neutral position, according to the multi-directional input apparatus described in Japanese Utility Model Publication No. H5-19925, although the set of upper and lower turning members are directly held at the neutral position, the operating member is held at the neutral position only indirectly. On the contrary, in the case of the multi-directional input apparatus described in each of Japanese Utility Model Publication Nos. H7-27608 and Japanese Patent Application Laid-Open No.H10-283885, although the operating member is directly held at the neutral position, the set of upper and lower turning members are held at the neutral position only indirectly. Therefore, in any of these apparatuses, the returning precision of the operating member and the turning members to the neutral positions is not sufficient.

The present invention has been accomplished in view of these circumstances, and it is a first object of the invention to provide a multi-directional input apparatus in which the apparatus can easily be reduced in size including its height. It is a second object of the invention to provide a multi-directional input apparatus in which the returning precision of the operating member to the neutral position is high.

DISCLOSURE OF THE INVENTION

To achieve the above object, the present invention provides a multi-directional input apparatus comprising a set of upper and lower turning members supported in the case such that the turning members can turn into two intersecting directions and each having a long hole extending in a direction perpendicular to the turning direction; an operating member passing through each of the long holes of the set of upper and lower turning members, the operating member turning each of the turning members when the operating member is operated in arbitrary direction therearound; a returning mechanism for returning the operating member from a position where the operating member is operated in the arbitrary direction therearound to a neutral position; and a set of signal output means connected to ends of the set of upper and lower turning members for outputting signal corresponding to a turning angle of each of the turning members; wherein the operating member is integrally provided at its lower portion with a turning shaft which is perpendicular to the operating member at right angles and/or a turning-type coming-out preventing portion comprising an upwardly swelling semi-spherical portion, and a recess into which the coming-out preventing portion is turnably fitted is provided in a lower surface of the lower turning members.

That is, in the multi-directional input apparatus of the present invention, in order to prevent the operating member from coming out, the turning shaft smaller than the spherical portion and/or a semi-spherical turning-type coming-out preventing portion is provided on the lower portion of the multi-directional input apparatus, the recess to which the coming-out preventing portion is fitted is provided in the lower surface of the lower turning member, thereby restraining the coming-out preventing portion from projecting downward. Therefore, the number of parts is small, and the apparatus can be reduced in size including the height.

The returning mechanism may resiliently hold either one of or both the operating member and the turning members.

When both the operating member and the turning members are resiliently held in the neutral position, the precision for returning the operating member to the neutral position can be improved. That is, the second object is achieved.

It is preferable that the returning mechanism includes a spring compressed and accommodated in the case, and a slider biased by the spring. With this feature, the precision for returning the operating member to the neutral position is further improved.

It is preferable that the slider resiliently abuts from below against a flat surface downwardly formed on a lower portion of the operating member and/or flat surfaces downwardly formed on opposite end shafts of the set of upper and lower turning members. This structure is especially effective when both the operating member and the turning members are resiliently held in the neutral position.

The operating member is supported from below by the upward boss and/or the returning mechanism provided on the bottom plate of the case.

It is preferable that the boss is provided at its upper surface with a downwardly swelling semi-spherical recess, and the operating member is provided at its lower surface with a downwardly swelling semi-spherical projection which fits into the recess. Further, it is preferable that the boss is provided at its upper surface with an upwardly swelling semi-spherical projection, and the operating member is provided at is lower surface with an upwardly swelling semi-spherical recess into which the projection is fitted. With the feature, the lower portion of the operating member is turnably supported in an arbitrary direction therearound reliably.

The boss can also serve as a guide for the slider.

Instead of the boss, a push switch may be disposed below the operating member. In this case, it is preferable to use the returning mechanism as a mechanism for biasing the operating portion upward.

The coming-out preventing portion may be a semi-spherical portion or the turning shaft. The semi-spherical portion may be provided with the turning shaft. In order to reduce the size of the apparatus, it is preferable that the turning shaft, especially an upwardly swelling semi-circular turning shaft is directly formed below the shaft of the operating member. The turning shaft can prevent the operating member from rotating around its center axis.

As the turning shaft, an upwardly swelling substantially semi-circular turning shaft integrally provided below the shaft is preferable because the entire height can be reduced. The turning shaft may project from opposite side of the lower portion of the operating member.

The slider may abut against the lower surface of the semi-spherical portion. That is, the semi-spherical portion can utilize the lower surface as a flat surface against which the slider abuts. When the semi-spherical portion is not provided, the disc is provided below the turning shaft so that the lower surface of the disc can be used as the flat surface against which the slider abuts. This is suitable for the substantially semi-circular turning shaft. As a pair of turning shafts projecting to the opposite directions, a downward flat surface may be provided on the lower portion of the operating member, substantially columnar turning shafts may be projected from the opposite sides of the flat surface.

It is preferable that the disc is accommodated in a recess provided in the lower surface of the lower turning members because the entire height can be reduced. In this case, the pair of bearings to which the turning shafts are fitted are provided in an inner surface of the recess.

The set of signal output means may be any of electric sensors, optical sensors and magnetic sensors, and the kind thereof is not limited.

EXPLANATION OF SYMBOLS

| | |
|---|---|
| 10 | case |
| 10a | lower case |
| 10b | upper case |
| 14 | boss |
| 15 | recess |
| 15' | projection |
| 20A, 20B | signal output means |
| 30 | operating member |
| 32 | disc |
| 33 | projection |
| 33' | recess |
| 34 | flat surface |
| 35 | turning shaft (coming-out preventing portion) |
| 36 | semi-spherical portion (coming-out preventing portion) |
| 40A, 40B | turning member |
| 41A, 41B | turning shaft |
| 42A | arc portion |
| 42B | semi-spherical portion |
| 43A, 43B | long hole |
| 44A, 44B | flat surface |
| 45A, 45B | projections |
| 46B | recess |
| 47B | bearing |
| 48A | connection portion |
| 50 | slider |
| 52 | first abutment surface |
| 53 | second abutment surface |
| 60 | spring |
| 70 | push switch |

EMBODIMENT OF THE INVENTION

Figure 1:
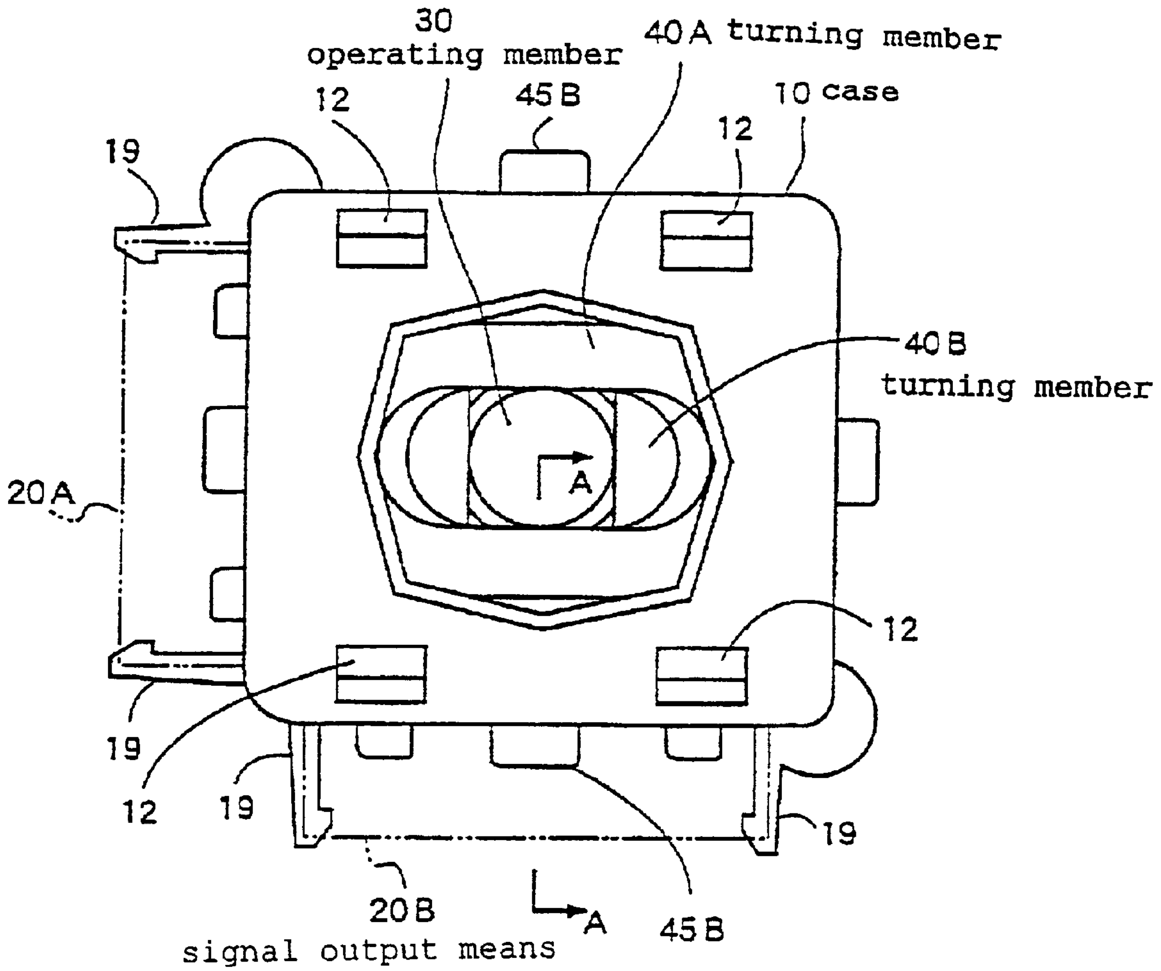
FIG. 1 is a plan view of a multi-directional input apparatus according to a first embodiment of the present invention.
Figure 2:
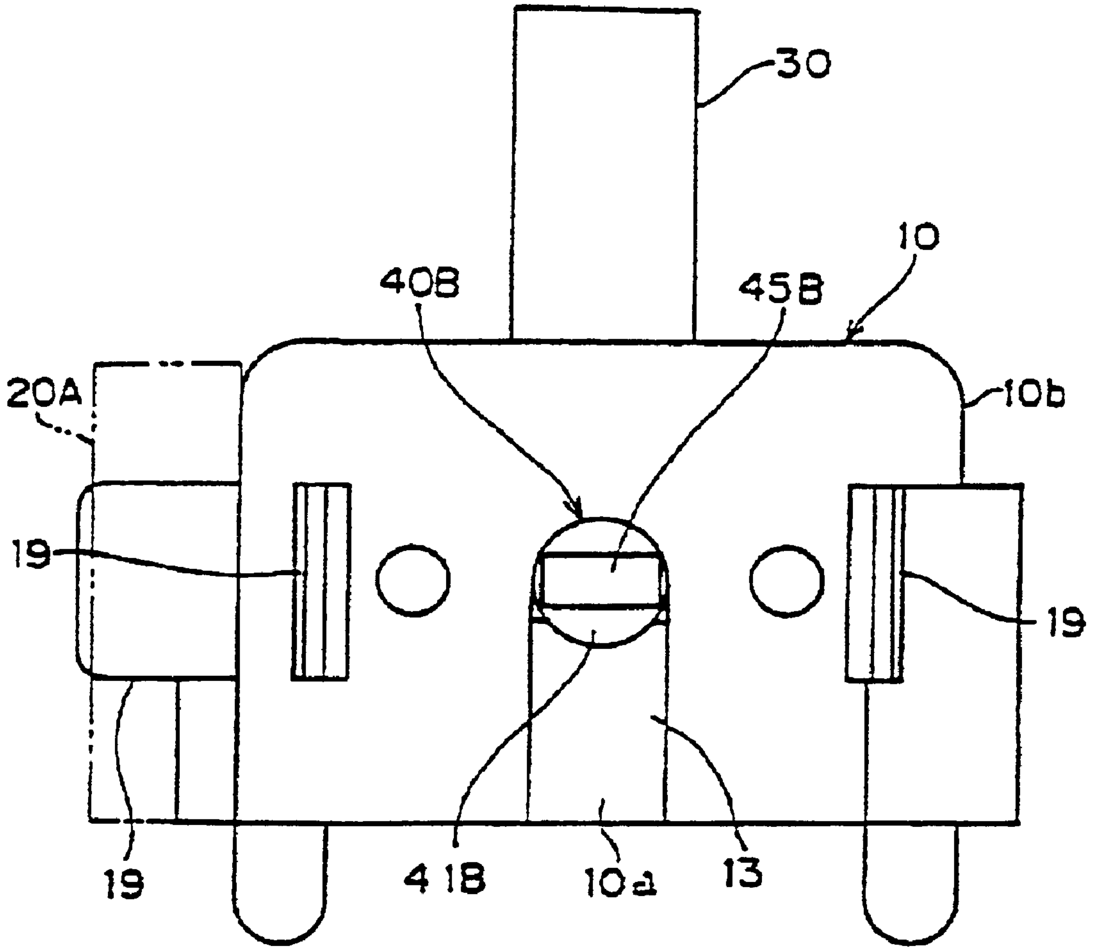
FIG. 2 is a front view of the multi-directional input apparatus.

As shown in FIGS. 1 and 2, a multi-directional input apparatus according to the embodiment of the present invention comprises a box-like case 10 disposed on a board, and signal output means 20A and 20B mounted to two crossing side surfaces of the case 10. The signal output means 20A and 20B may be any of electric sensors, optical sensors and magnetic sensors, and the kind thereof is not limited.

Figure 3:
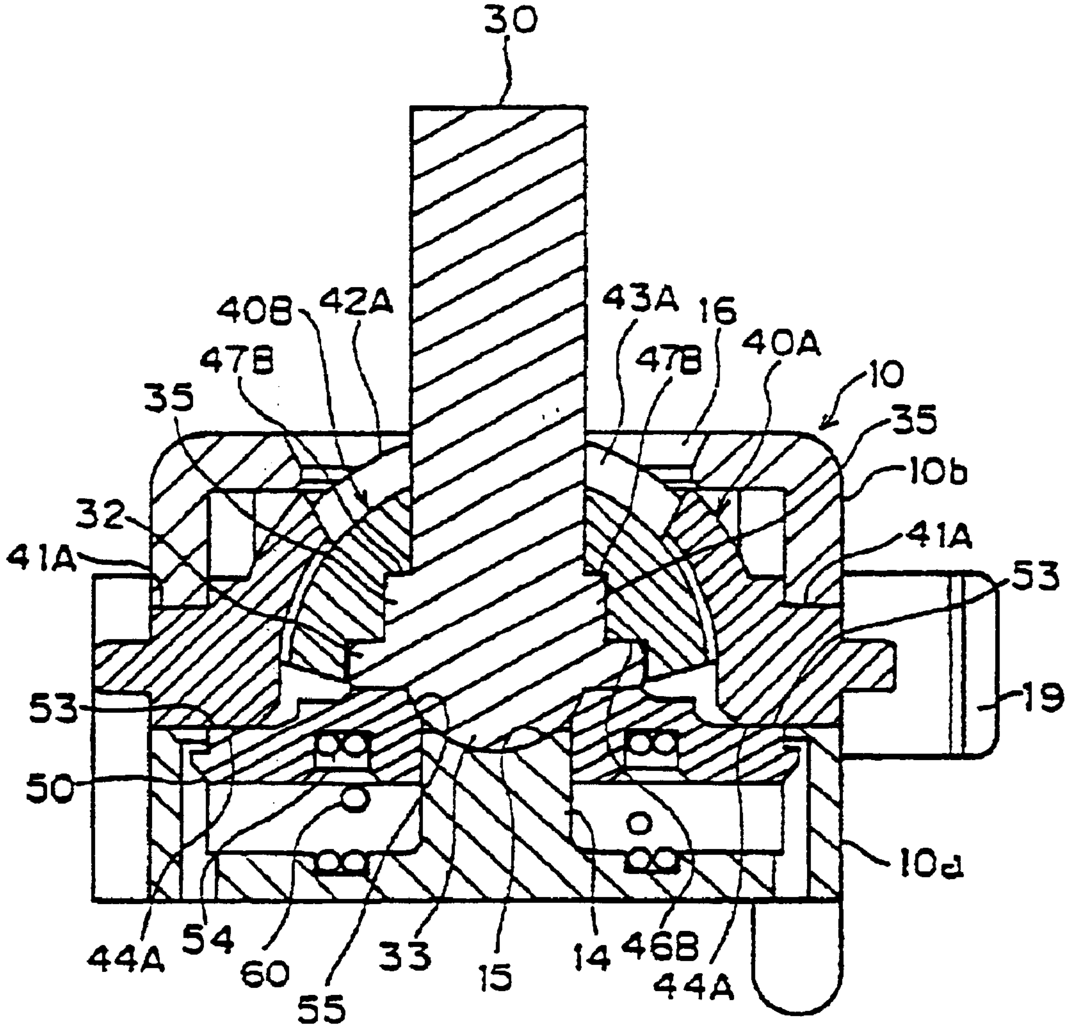
FIG. 3 is a longitudinal sectional front view of the multi-directional input apparatus.
Figure 4:
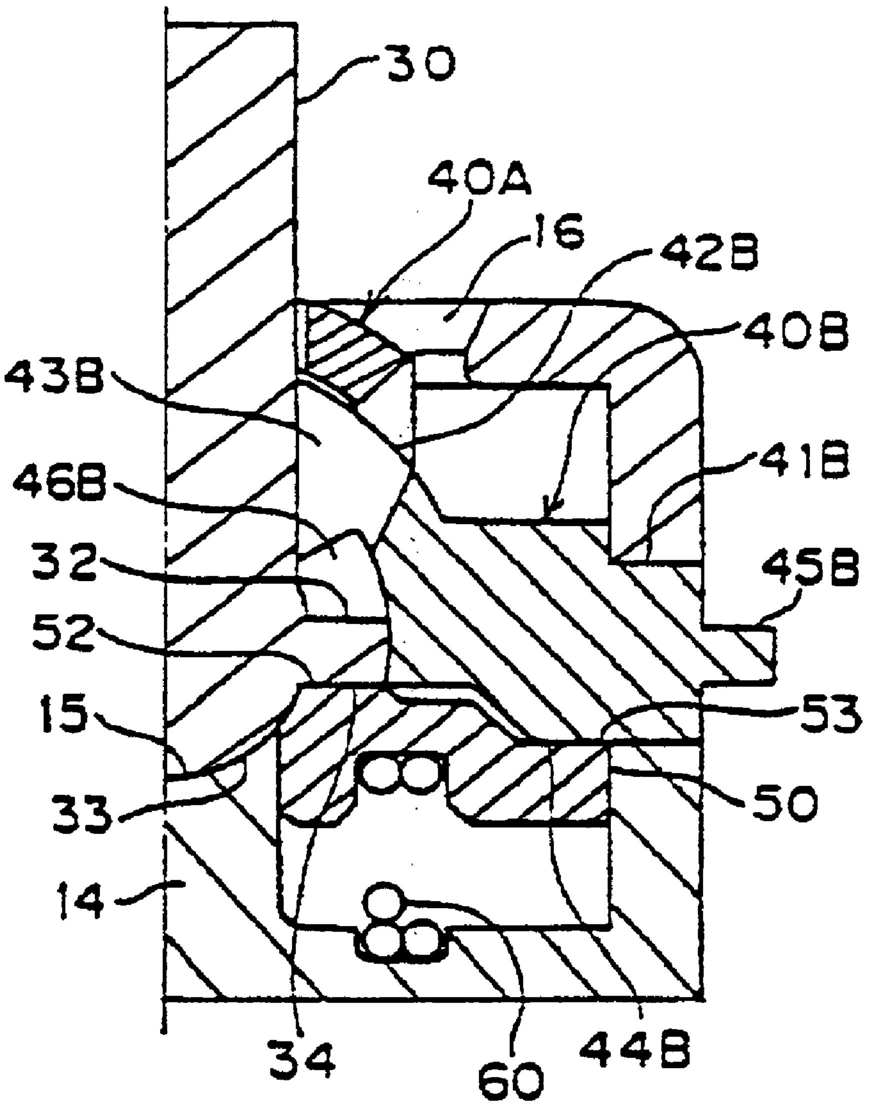
FIG. 4 is a sectional view taken along an arrow A—A in FIG. 1.

As shown in FIGS. 3 and 4, accommodated in the case 10 are a rod-like operating member 30 which is inclined in an arbitrary direction around its lower portion, a set of upper and lower turning members 40A and 40B turned by the operating member 30, a slider 50 as a returning mechanism for automatically returning the operating member 30 to a neutral position, and a spring 60.

Structures of the case 10, the operating member 30, the turning members 40A and 40B and the slider 50 will be explained in detail below.

The case 10 is of a two-piece structure comprising a combination of a lower case 10*a* forming a bottom plate of the case 10 and an upper case 10*b* fitted to the lower case 10*a* from above.

Figure 5:
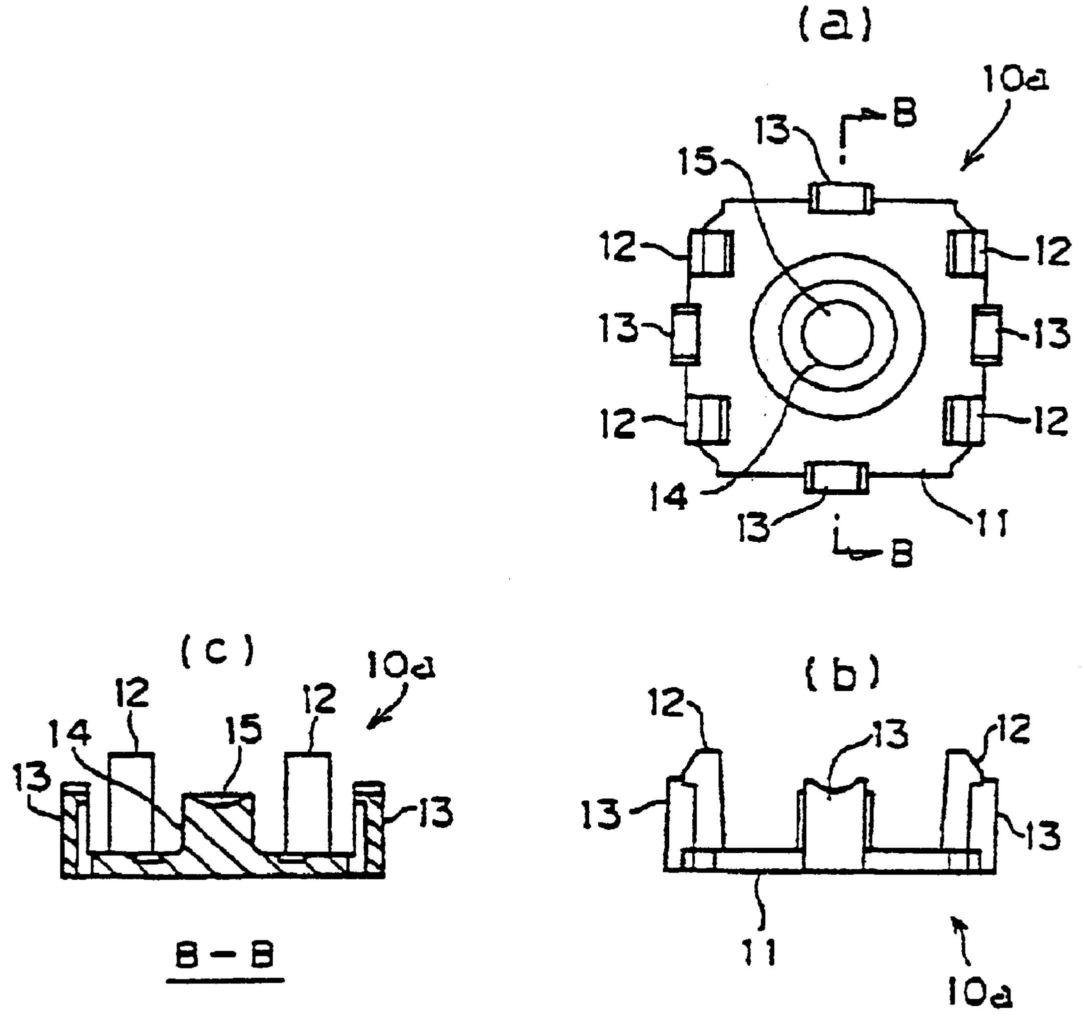
FIG. 5 shows a lower case used in the multi-directional input apparatus, wherein FIG. 5(*a*) is a plan view, FIG. 5(*b*) is a front view and FIG. 5(*c*) is a sectional view taken along an arrow B—B.

As shown in FIG. 5, the lower case 10*a* has a rectangular bottom plate 11. Two parallel sides of the bottom plate 11 are provided with pawls 12 upwardly projecting for securing the lower case 10*a* to the upper case 10*b*. A central portion of each side of the bottom plate 11 is provided with a support 13 projecting upward for supporting the turning members 40A and 40B. A central portion of an upper surface of the bottom plate 11 is provided with a boss 14 having a circular cross section serving as a support member for the operating member 30 and a guide member for the slider 50. An upper end surface of the boss 14 is formed with a downwardly swelling semi-spherical recess 15.

Figure 6:
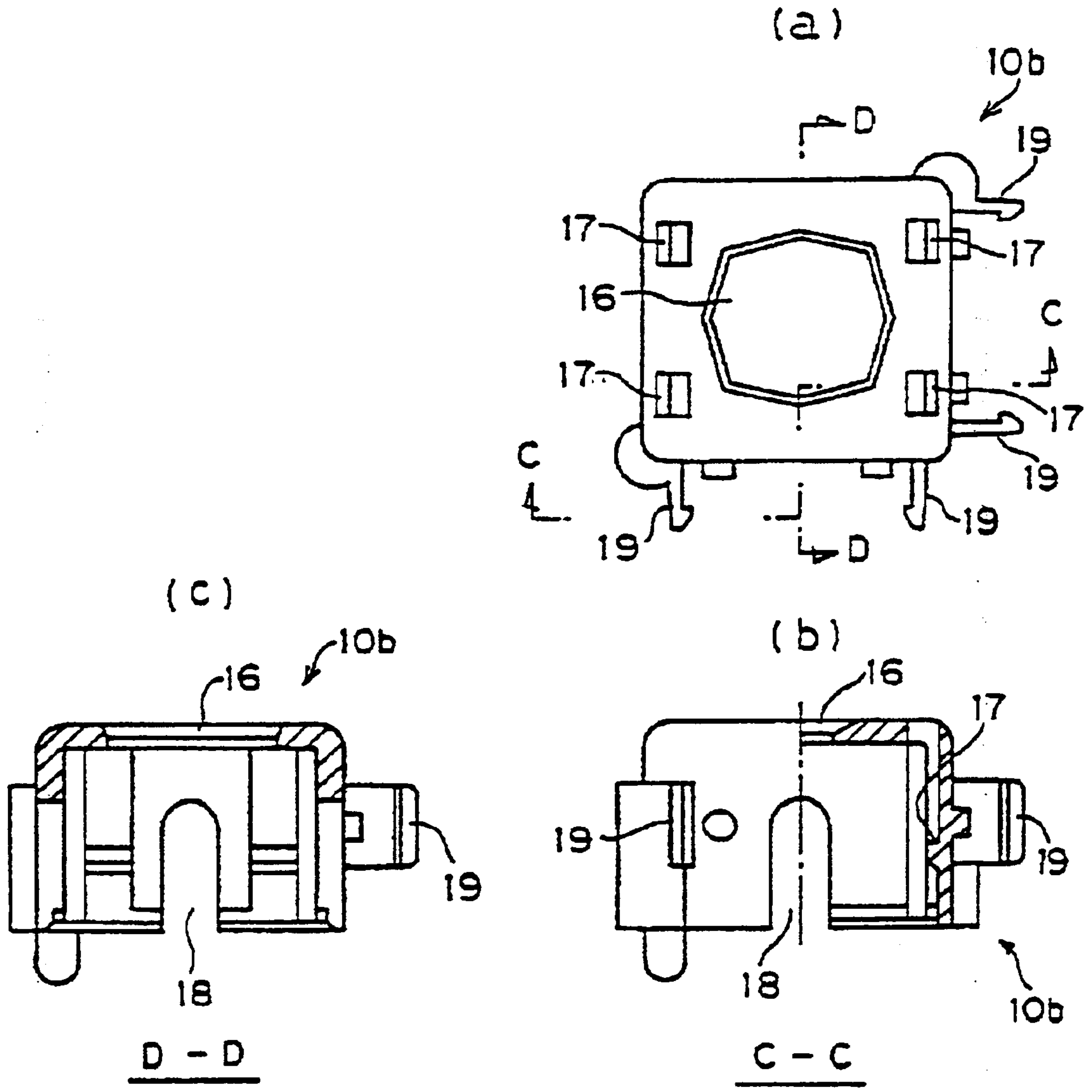
FIG. 6 show an upper case used in the multi-directional input apparatus, wherein FIG. 6(*a*) is a plan view, FIG. 6(*b*) is a front view and FIG. 6(*c*) is a sectional view taken along an arrow B—B.

As shown in FIG. 6, the upper case 10*b* to be put on the lower case 10*a* is a box-like cap whose lower surface is opened. A ceiling of the upper case 10*b* is provided with an opening 16 through which an upper portion of the operating member 30 projects upward. Each side wall of the upper case 10*b* is provided with a notch 18 into which the support 13 is fitted. Inner surfaces of two parallel side walls are provided with fitting portions into which the pawls 12 are fitted. Crossing two side walls are provided with pairs of pawls 19 at opposite sides of the side for securing the signal output means 20A and 20B.

When the upper case 10*b* is put on the lower case 10*a*, the pawls 12 of the lower case 10*a* are fitted to the fitting portions 17 of the upper case 10*b*, thereby securing the lower case 10*a* to the upper case 10*b*. When the supports 13 of the lower case 10*a* are fitted to the notches 18 of the upper case 10*b*, each of the side surfaces of the case 10 are formed with a circular opening for supporting opposite end shafts of the turning members 40A and 40B. The signal output means 20A and 20B are secured to the two crossing side surfaces of the case 10 by means of the pawls 19.

Figure 7:
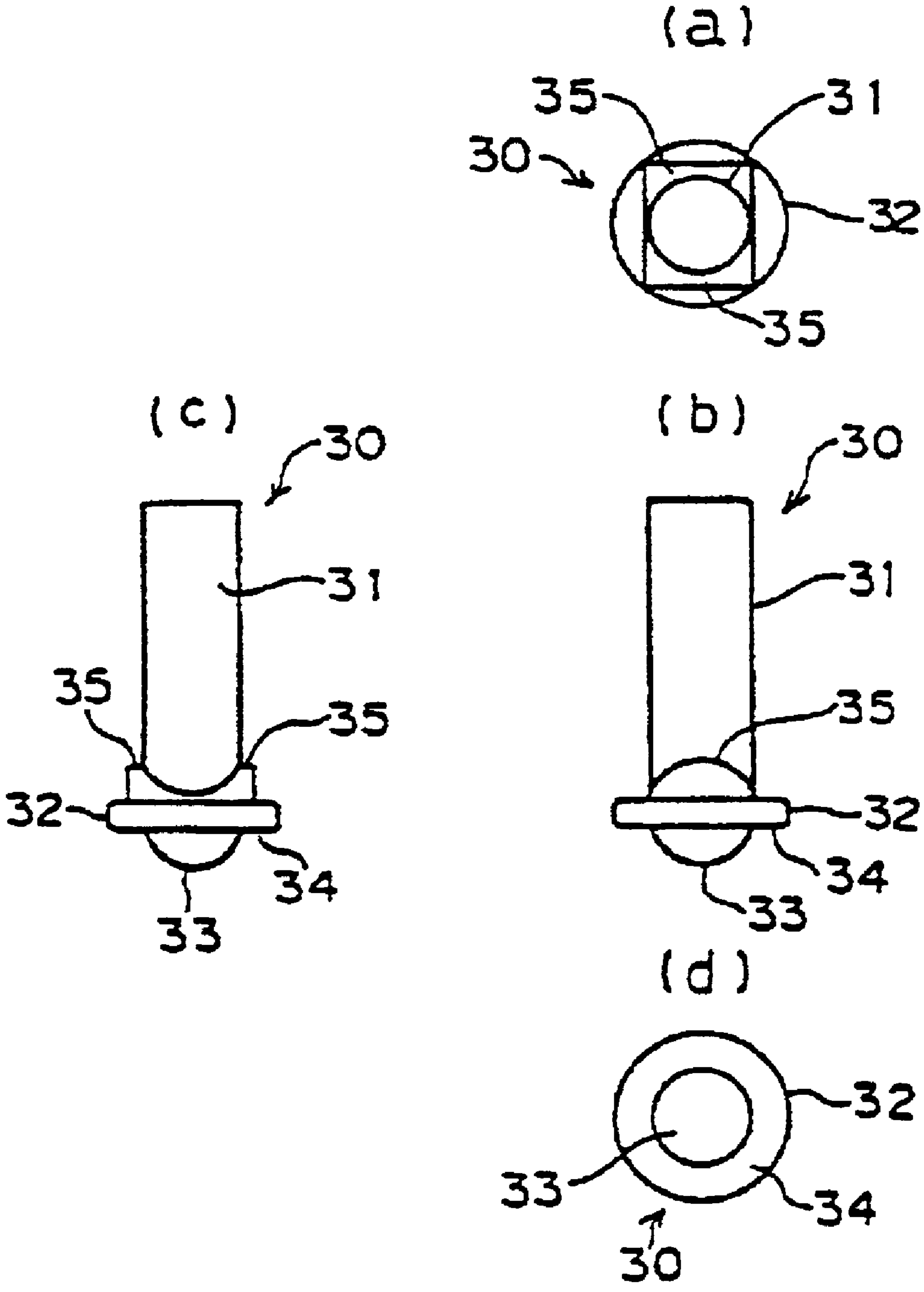
FIG. 7 show an operating member used in the multi-directional input apparatus, wherein FIG. 7(*a*) is a plan view, FIG. 7(*b*) is a front view, FIG. 7(*c*) is a side view and FIG. 7(*d*) is a bottom view.

As shown in FIG. 7, the operating member 30 includes a shaft 31 comprising a straight rod. Turning shafts 35 and 35 projecting in two directions crossing the operating member 30 are provided on the lower portion of the shaft 31. Each of the turning shafts 35 and 35 has a semi-circular upper surface. A lower portion of each the turning shaft 35 is provided with a disc 32 having a diameter greater than the shaft 31. A central portion of a lower surface of the disc 32 is provided with a downwardly swelling semi-spherical projections 33. The projections 33 have shape corresponding to a recess formed in an upper end surface of the boss 14. A lower surface of the disc 32 except its central portion is a flat surface 34 against which the slider 50 abuts resiliently. Center lines of the turning shafts 35 and 35 cross centers of the semi-spherical projections 33.

Figure 8:
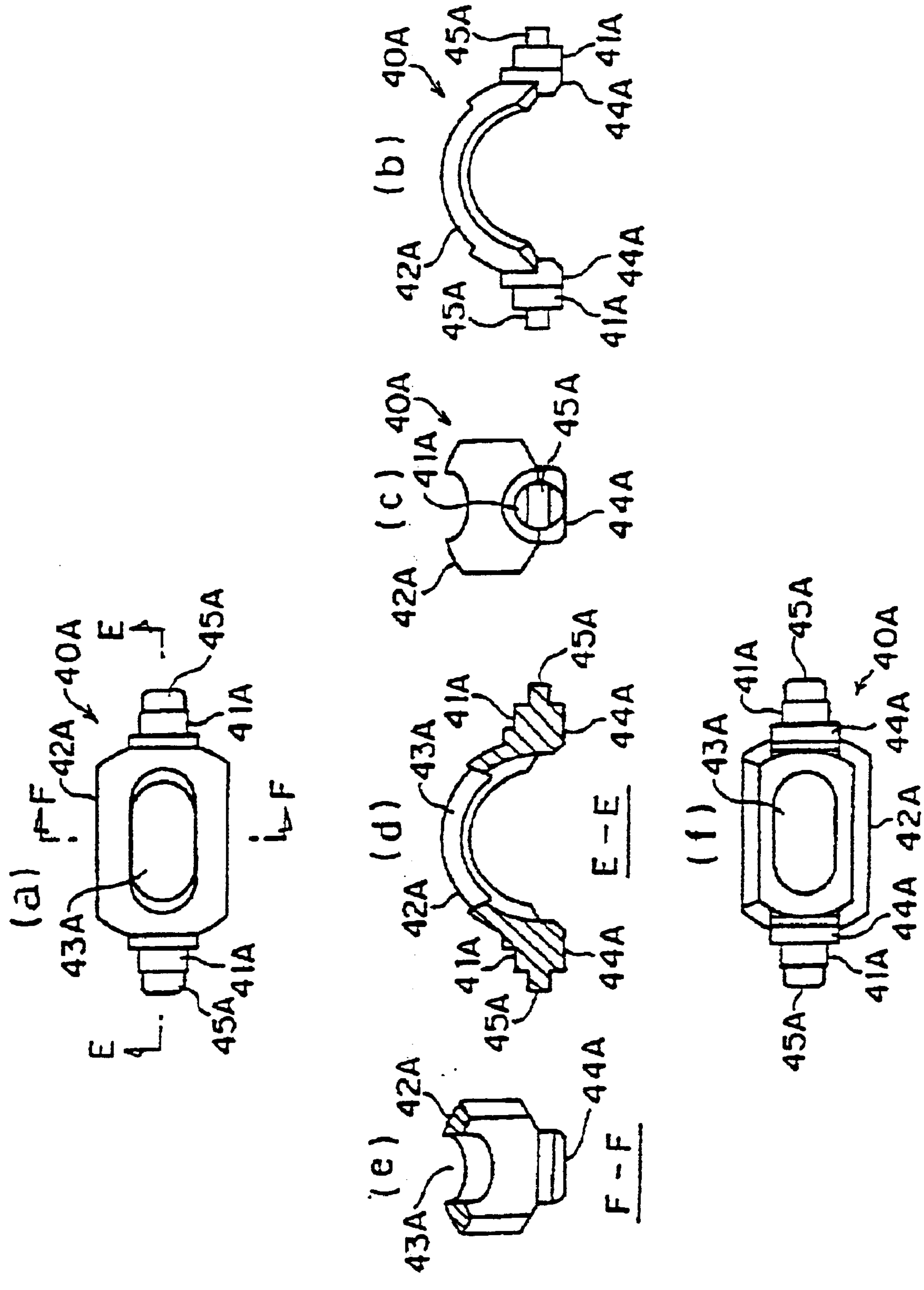
FIG. 8 show an upper turning member used in the multi-directional input apparatus, wherein FIG. 8(*a*) is a plan view, FIG. 8(*b*) is a side view, FIG. 8(*c*) is a front view, FIG. 8(*d*) is a sectional view taken along an arrow E—E, FIG. 8(*e*) is a sectional view taken along an arrow F—F and FIG. 8(*f*) is a bottom view.

As shown in FIG. 8, the upper turning member 40A is provided at its opposite ends with turning shafts 41A and 41A each having a circular cross section, and is provided with an upwardly swelling arc 42A between the turning shafts 41A and 41A. The arc 42A is provided with a long hole 43A extending in a turning center axis direction as a guide hole for the operating member 30. An inner surface of the arc 42A is an arc surface in a direction of the long hole 43A and in a direction perpendicular to the long hole 43A so that the turning movements of the turning members 40A and 40B are not hindered.

Lower surfaces of the shafts for connecting the turning shafts 41A and 41A and the arc 42A are flat surfaces 44A and 44A against which the slider 50 resiliently abuts from below. The flat surfaces 44A and 44A are located slightly below a lower surface (flat surface 34) of the disc 32 of the operating member 30. Tip end surfaces of the turning shafts 41A and 41A are provided with projections 45A and 45A for connecting the signal output means to the turning shafts 41A and 41A.

Figure 9:
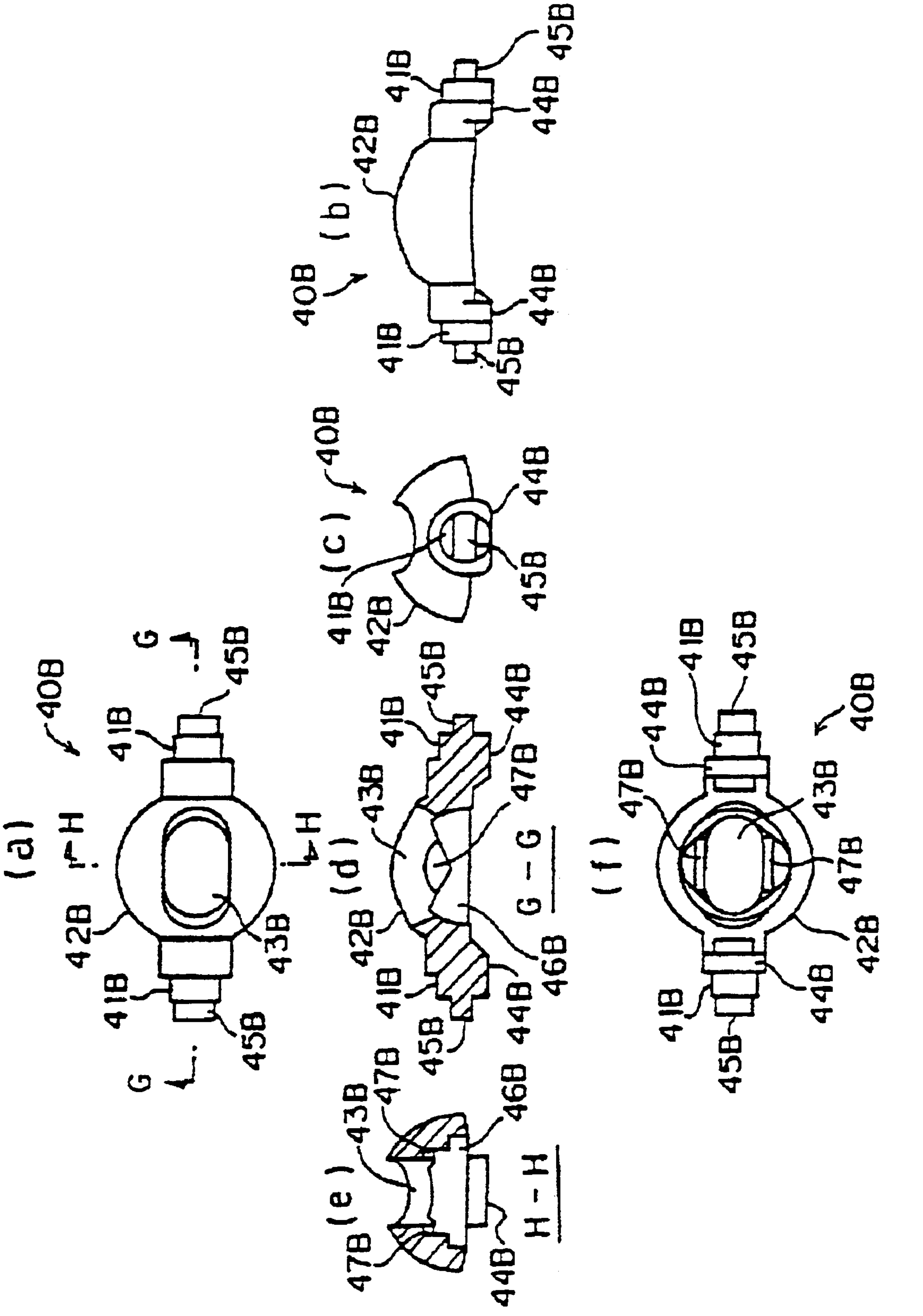
FIG. 9 show a lower turning member used in the multi-directional input apparatus, wherein FIG. 9(*a*) is a plan view, FIG. 9(*b*) is a front view, FIG. 9(*c*) is a side view, FIG. 9(*d*) is a sectional view taken along an arrow G—G, FIG. 9(*e*) is a sectional view taken along an arrow H—H and FIG. 9(*f*) is a bottom view.

The lower turning member 40B is combined with a lower portion of the upper turning member 40A at right angles. As shown in FIG. 9, the turning member 40B is provided at its opposite ends with turning shafts 41B and 41B each having a circular cross section, and with an upwardly swelling semi-spherical portion 42B between the turning shafts 41B and 41B. The semi-spherical portion 42B is provided with a long hole 43B extending in a turning motion center axis direction as a guide hole for the operating member 30. A lower surface of the semi-spherical portion 42B is provided with a recess 46B into which the disc 32 of the operating member 30 is rotatably fitted, and is provided at its inner surface with semi-circular bearings 47B and 47B into which the semi-circular turning shaft 35 are fitted. The long hole 43B is sandwiched between the bearings 47B and 47B.

Shafts connecting the turning shafts 41B and 41B and the semi-spherical portion 42B are flat surfaces 44B and 44B against which the slider 50 resiliently abuts from below. The flat surfaces 44B and 44B are flush with the flat surfaces 44A and 44A of the turning member 40A. Tip end surfaces of the turning shafts 41B and 41B are provided with projections 45B and 45B for connecting the signal output means.

As shown in FIGS. 3 and 4, the set of upper and lower turning members 40A and 40B are incorporated in the case 10 in a state in which the turning center axes thereof are intersecting at right angles in the same plane, and rotatably supported in the case 10. The operating member 30 is inserted through the long holes 43A and 43B of the turning members 40A and 40B. The disc 32 is fitted into the recess 46B of the turning member 40B. The turning shafts 35 and 35 are fitted to the bearings 47B and 47B provided in the inner surfaces of the recess 46B. The projections 33 are fitted in the recess 15 formed on the upper end surface of the boss 14 of the lower case 10*a*. In this state, the operating member 30 is incorporated in the turning members 40A and 40B in the case 10.

With this operation, the operating member 30 can be inclined in all direction around the projections 33 on the boss 14. The operating member 30 is inclined in the direction of the long hole 43B of the lower turning member 40B around the turning shafts 35 and 35. With this structure, the upper turning member 40A is turned along the upper surface of the semi-spherical portion 42B of the lower turning member 40B. When the operating member 30 is inclined in the direction of the long hole 43A of the upper turning member 40A around the turning shafts 41B and 41B of the lower turning member 40B, the lower turning member 40B is turned along the lower surface of the arc 42A of the upper turning member 40A.

Figure 10:
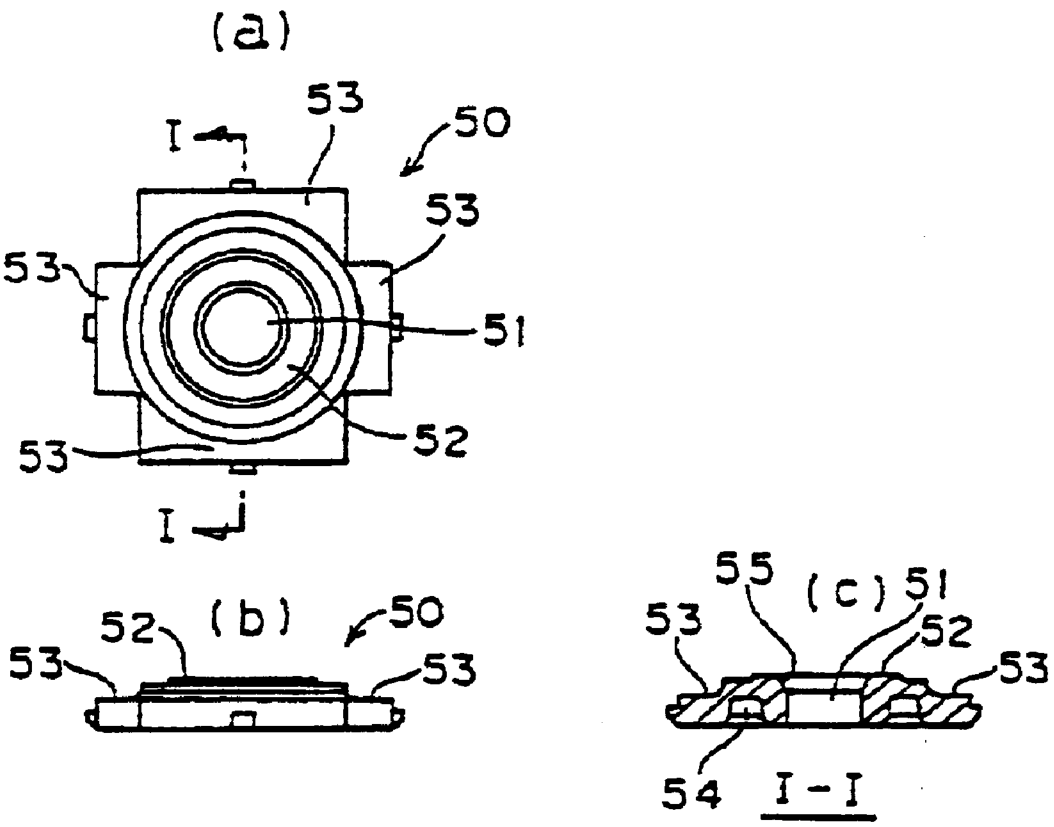
FIG. 10 show a slider used in the multi-directional input apparatus, wherein FIG. 10(*a*) is a plan view, FIG. 10(*b*) is a front view and FIG. 10(*c*) is a sectional view taken along an arrow I—I.

As shown in FIG. 10, the slider 50 for automatically returning the operating member 30 to the neutral position is substantially rectangular plate-like member which is vertically movably fitted into the lower case 10*a*. The slider 50 is provided at its center portion with a hole 51 through which the projection 33 abuts against the boss 14 of the lower case 10*a*. The slider 50 can vertically move along the wall surfaces of the upper and lower cases 10*a* and 10*b* as a guide. A diameter of the hole 51 is substantially equal to a diameter of the boss 14 of the lower case 10*a* so that the boss 14 can have a function as a guide. With this featured, the slider 50 can vertically move more reliably. In order to turnably support the lower portion of the operating member 30, a periphery of the hole 51 is formed with a curved tapered portion 55 into which the projection 33 is fitted. An annular flat surface formed on an upper surface of the slider 50 located around the hole 51 is a first abutment surface 52 which comes into contact with a lower surface (flat surface 34) of the disc 32 of the operating member 30. Four flat surfaces provided around the first abutment surface 52 are second abutment surfaces 53 which respectively come into contact with the flat surfaces 44A and 44A of the turning member 40A and the flat surfaces 44B and 44B of the turning member 40A.

The slider 50 is provided at its lower surface with a circular groove 54 into which the spring 60 is fitted.

The spring 60 is compressed and accommodated between the slider 50 and the bottom plate 11 of the lower case 10*a*. The 50 is biased upward by the spring 60, and the slider 50 brings the first abutment surface 52 into contact with the lower surface (flat surface 34) of the disc 32 of the operating member 30 resiliently, thereby directly holding the operating member 30 at the neutral position. The second abutment surfaces 53 is brought into contact resiliently with the flat surfaces 44A and 44A of the turning member 40A and the flat surfaces 44B and 44B of the turning member 40B, thereby directly holding the turning members 40A and 40B in the neutral position.

Next, a function of the multi-directional input apparatus of the first embodiment of the present invention will be explained.

When the operating member 30 is not operated, the first abutment surface 52 of the slider 50 comes into contact resiliently with the lower surface (flat surface 34) of the disc 32, and the operating member 30 is directly held resiliently in the neutral position. The flat surfaces 44A and 44A and the flat surfaces 44B and 44B of the turning members 40A and 40B also come into contact resiliently with the second abutment surfaces 53 of the slider 50, and the turning members 40A and 40B are directly held in the neutral position. Therefore, the returning precision of the operating member 30 to the neutral position is improved.

When the operating member 30 is inclined into the direction of the long hole 43B of the lower turning member 40B, the upper turning member 40A is turned, and the signal output means 20A is operated, and a signal corresponding to the operation amount is output. When the operating member 30 is inclined into the direction of the long hole 44A of the upper turning member 40A, the lower turning member 40B is turned, the signal output means 20B is operated, and a signal corresponding to the operation amount is output. By combining these structure, the operating member 30 is operated into an arbitrary direction, and a signal corresponding to the direction and the amount of the operation is input to the electronic equipment which uses this multi-directional input apparatus.

At the time of this operation, the lower surface (flat surface 34) of the disc 32 of the operating member 30 is inclined. Further, the flat surfaces 44A and 44A of the turning member 40A and the flat surfaces 44B and 44B of the turning member 40B are inclined. With the inclination, the slider 50 is pushed down against the biasing force of the spring 60, and this applies returning force to the operating member 30 and the turning members 40A and 40B.

The operating member 30 is integrally formed at its lower portion with the turning shafts 35 and 35. Therefore, the number of parts is reduced as compared with an operating member using pins as turning shafts. Further, a length of the operating member 30, especially a length of the operating member 30 accommodated in the case 10 is shortened, and it is easy to reduce the apparatus in size including the height. Furthermore, the turning shafts 35 and 35 are directly provided without through the semi-spherical portions and thus, the projecting amount thereof is small correspondingly, the turning members 40A and 40B are reduced in size and thus, the apparatus can also be reduced in size.

The lower portion of the operating member 30 is turnably supported between the lower turning member 40B and the boss 14 of the case 10. That is, the operating member 30 is pivotally supported utilizing both the case 10 and the turning member 40B. Further, the turning shafts 35 and 35 provided on the lower portion of the operating member 30 for pivotally supporting the operating member 30 are accommodated in the lower turning member 40B together with the disc 32 below the turning shafts 35 and 35. Therefore, the apparatus can also be made smaller.

By providing the turning shafts 35 and 35 on the lower portion of the operating member 30, the operating member 30 is prevented from coming out upward and prevented from rotating around its axis.

Figure 11:
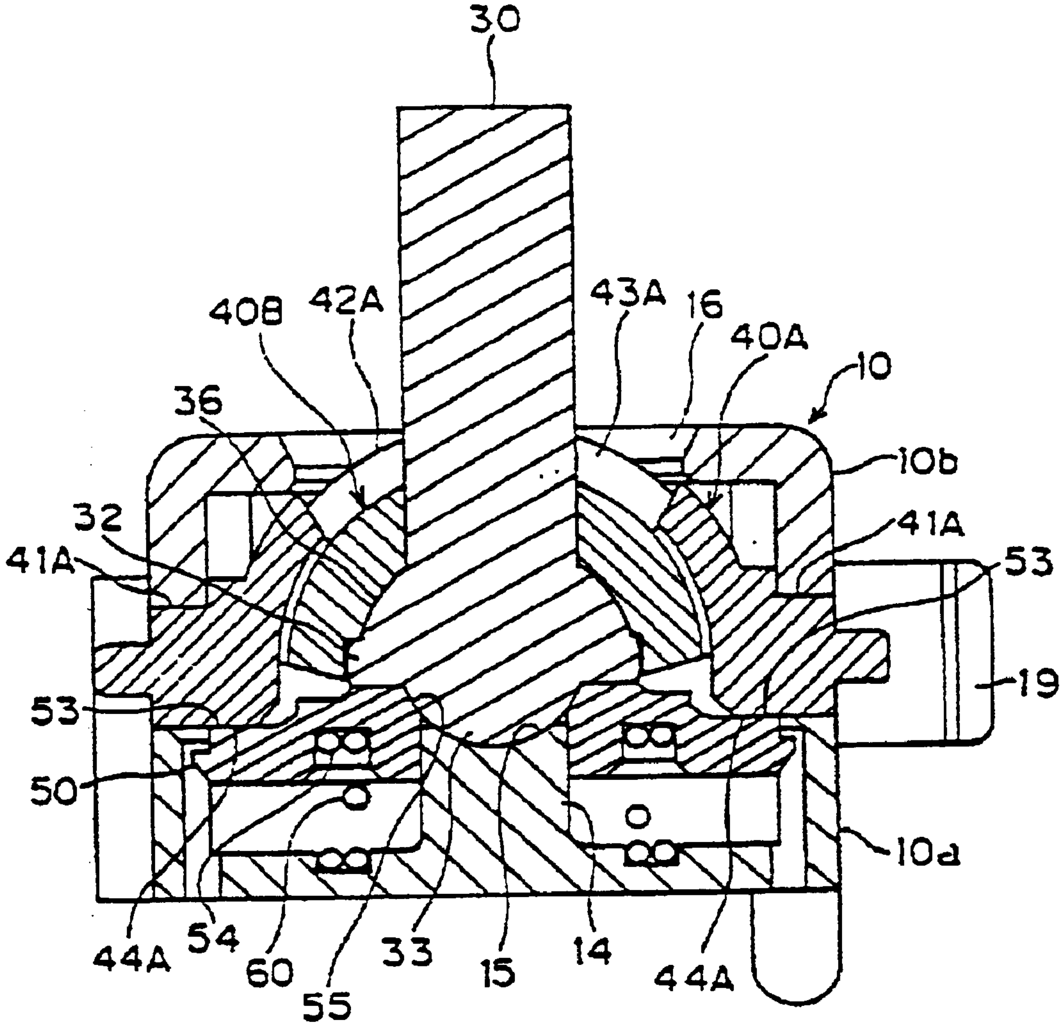
FIG. 11 is a longitudinal sectional view of a multi-directional input apparatus according to a second embodiment of the invention.

Next, a multi-directional input apparatus of a second embodiment of the invention will be explained with reference. FIG. 11. This apparatus is different from the multi-directional input apparatus of the first embodiment in that an upwardly swelling semi-spherical portion 36 is provided on the operating member 30 instead of the turning shafts 35 and 35. The semi-spherical portion 36 is integrally formed on the lower disc 32. The semi-spherical portion 36 also contributes to suppression of height of the apparatus like the turning shafts 35 and 35.

Figure 12:
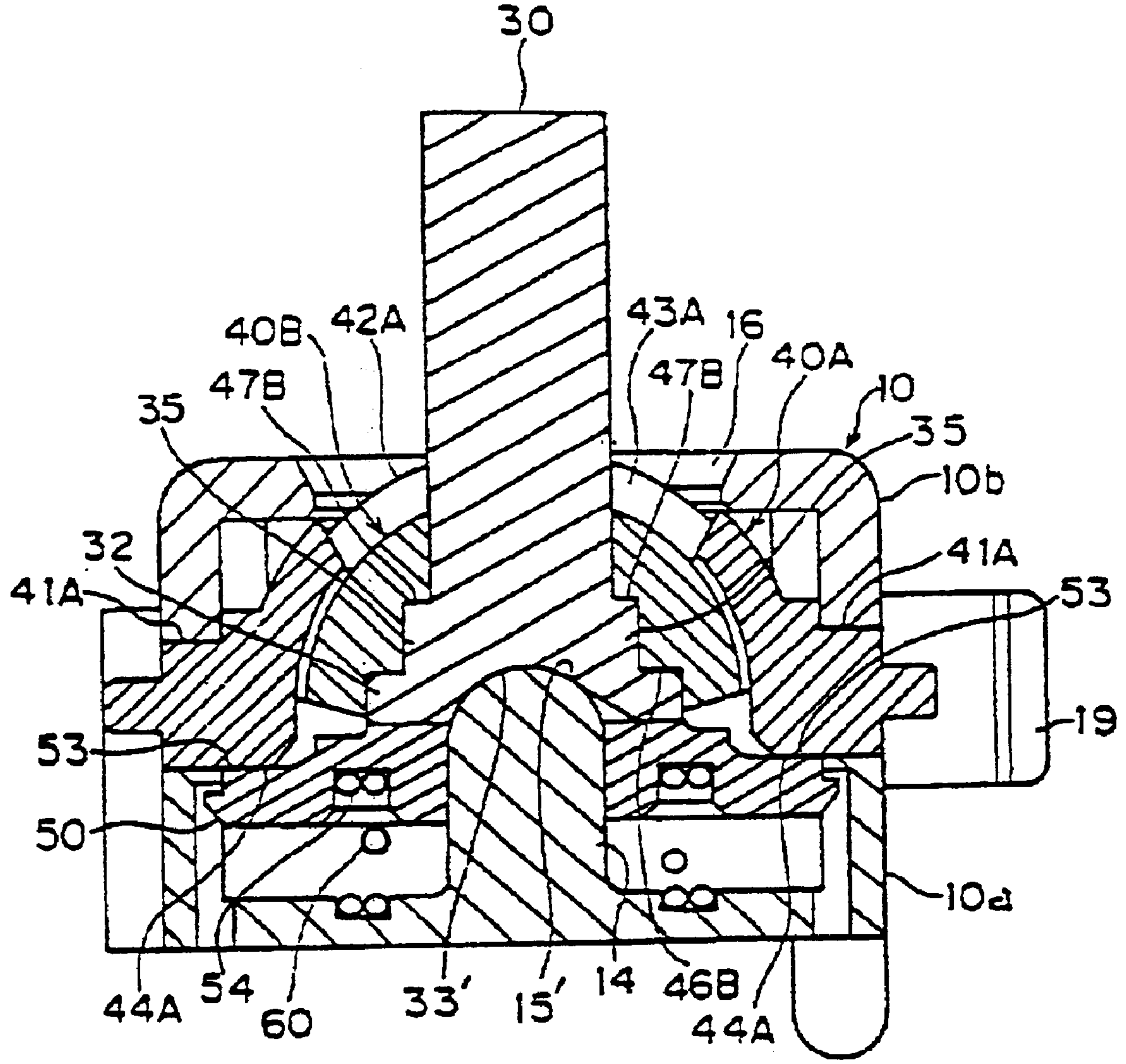
FIG. 12 is a longitudinal sectional view of a multi-directional input apparatus according to a third embodiment of the invention.

A multi-directional input apparatus of a third embodiment will be explained with reference to FIG. 12.

This apparatus is different from the multi-directional input apparatus of the first embodiment in that the operating member 30 is provided at its lower surface with an upwardly swelling semi-spherical recess 33', and the boss 14 is provided with an upwardly swelling semi-spherical projection 15' which is to be fitted to the recess 33'.

Figure 13:
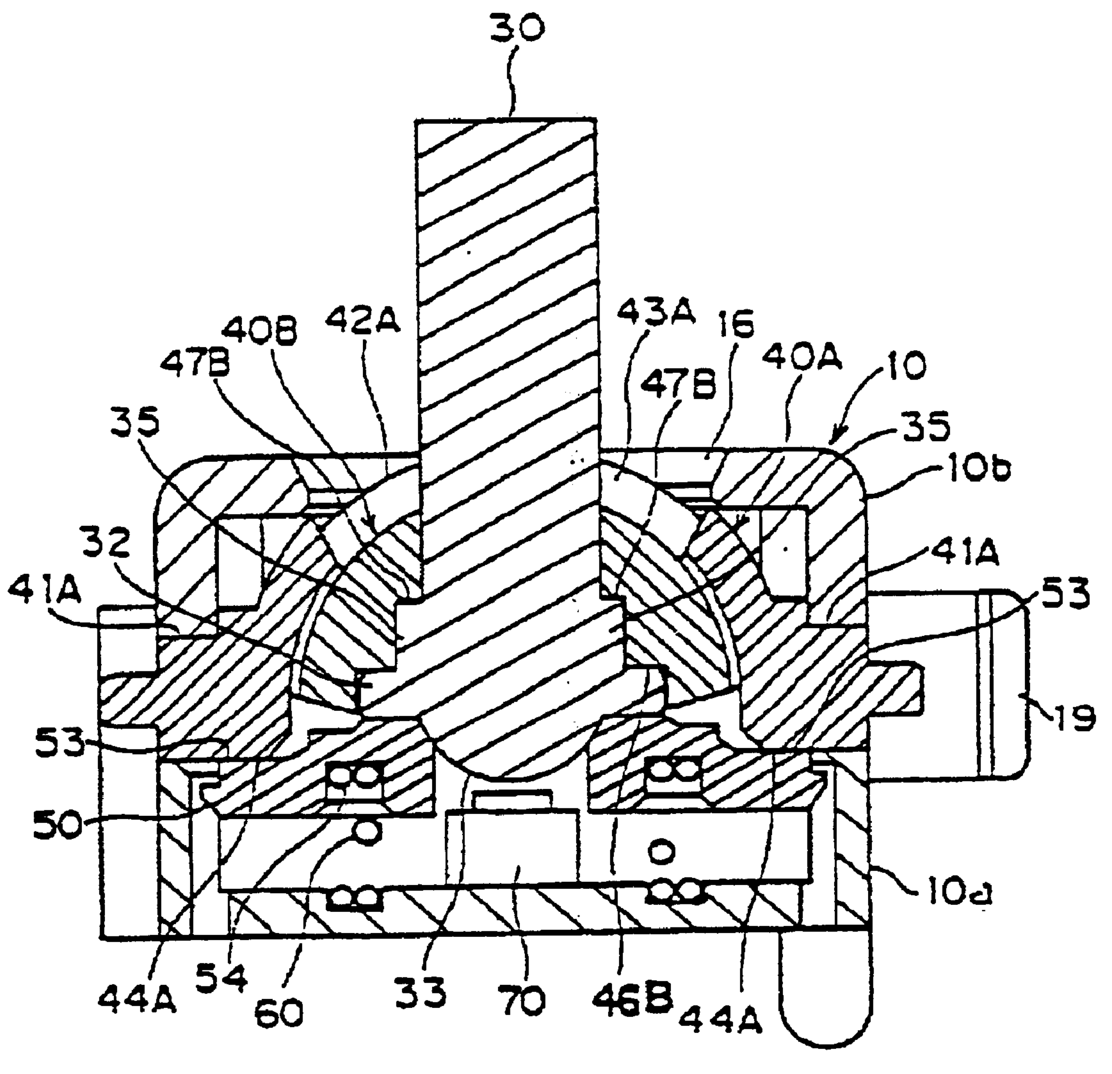
FIG. 13 is a longitudinal sectional view of a multi-directional input apparatus according to a fourth embodiment of the invention.

A multi-directional input apparatus of a fourth embodiment will be explained with reference to FIG. 13.

This apparatus is different from the multi-directional input apparatus of the first embodiment in that a push switch 70 is provided below the operating member 30 instead of the boss 14. In this case, the operating member 30 is resiliently supported by the slider 50 from below. The slider 50 resiliently holds the operating member 30 in the neutral position. The push switch 70 is an independent switch operated when the operating member 30 is pushed down, and a membrane on the board may be used as the push switch 70.

A multi-directional input apparatus of a fifth embodiment will be explained with reference to FIGS. 15 to 20.

This apparatus is different from the above-described multi-directional input apparatus in structures of coming-out preventing portion of the operating member 30 and the returning mechanism.

Figure 14:
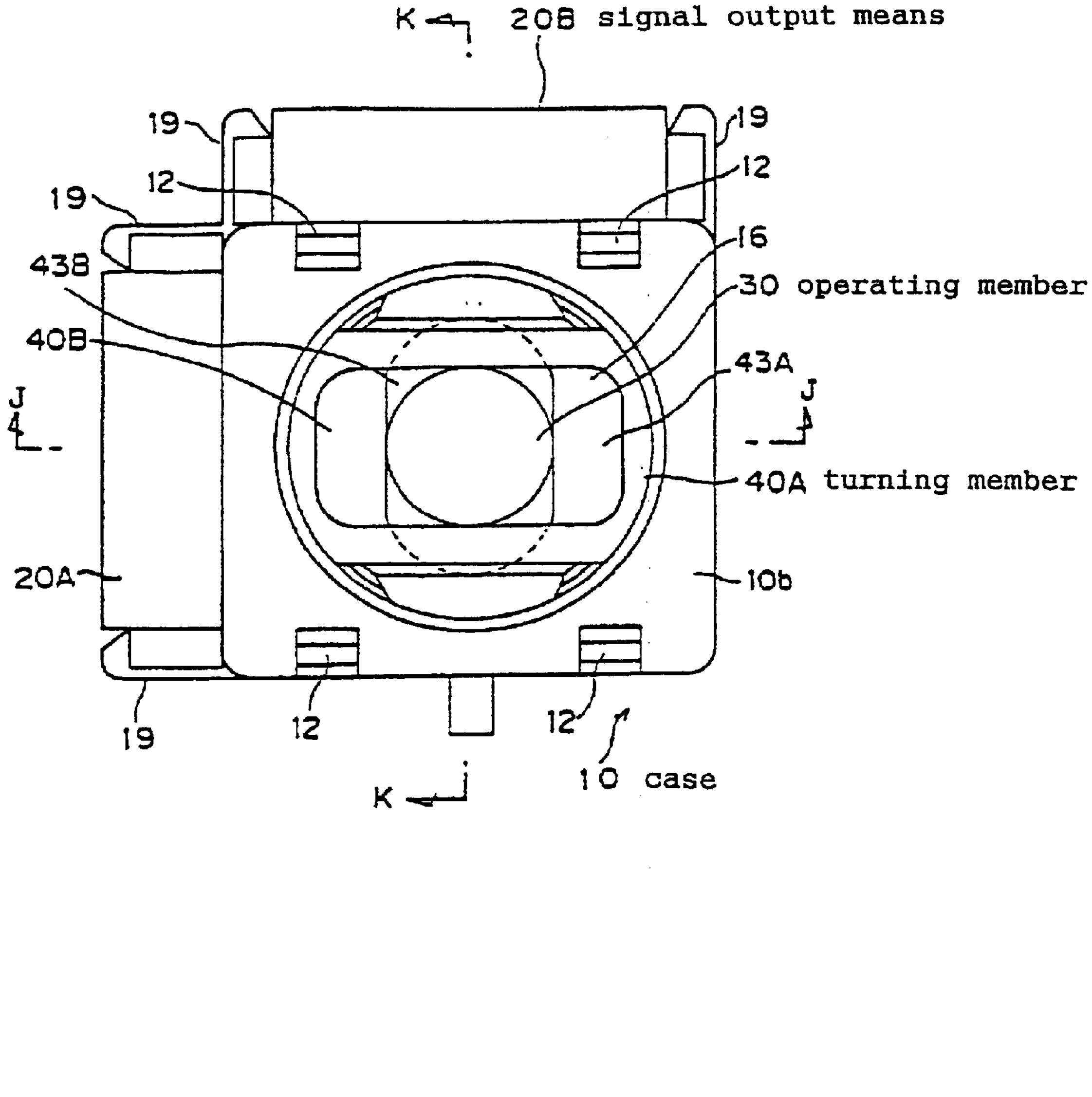
FIG. 14 is a plan sectional view of a multi-directional input apparatus according to a fifth embodiment of the invention.
Figure 15:
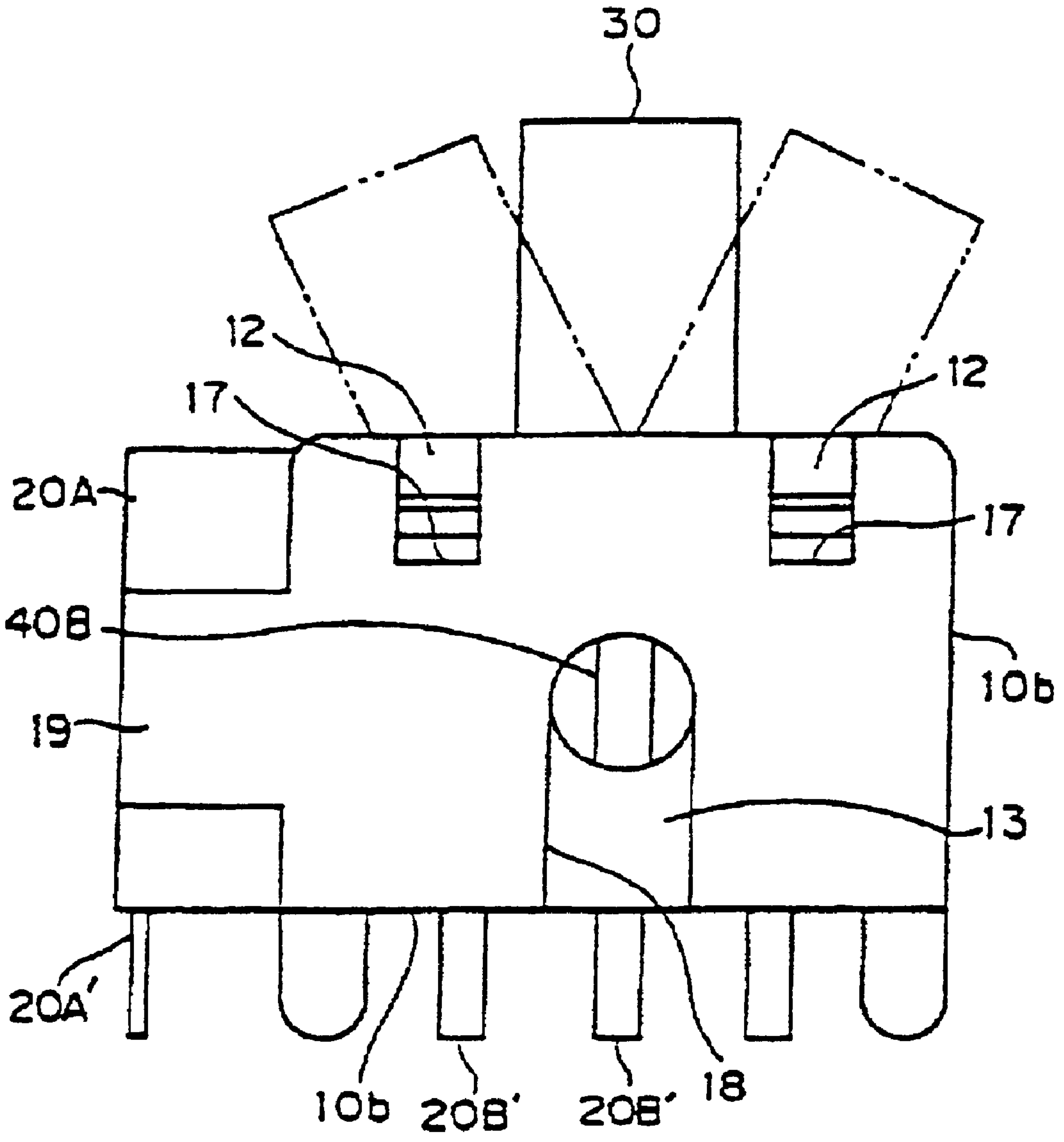
FIG. 15 is a front view of the multi-directional input apparatus.
Figure 16:
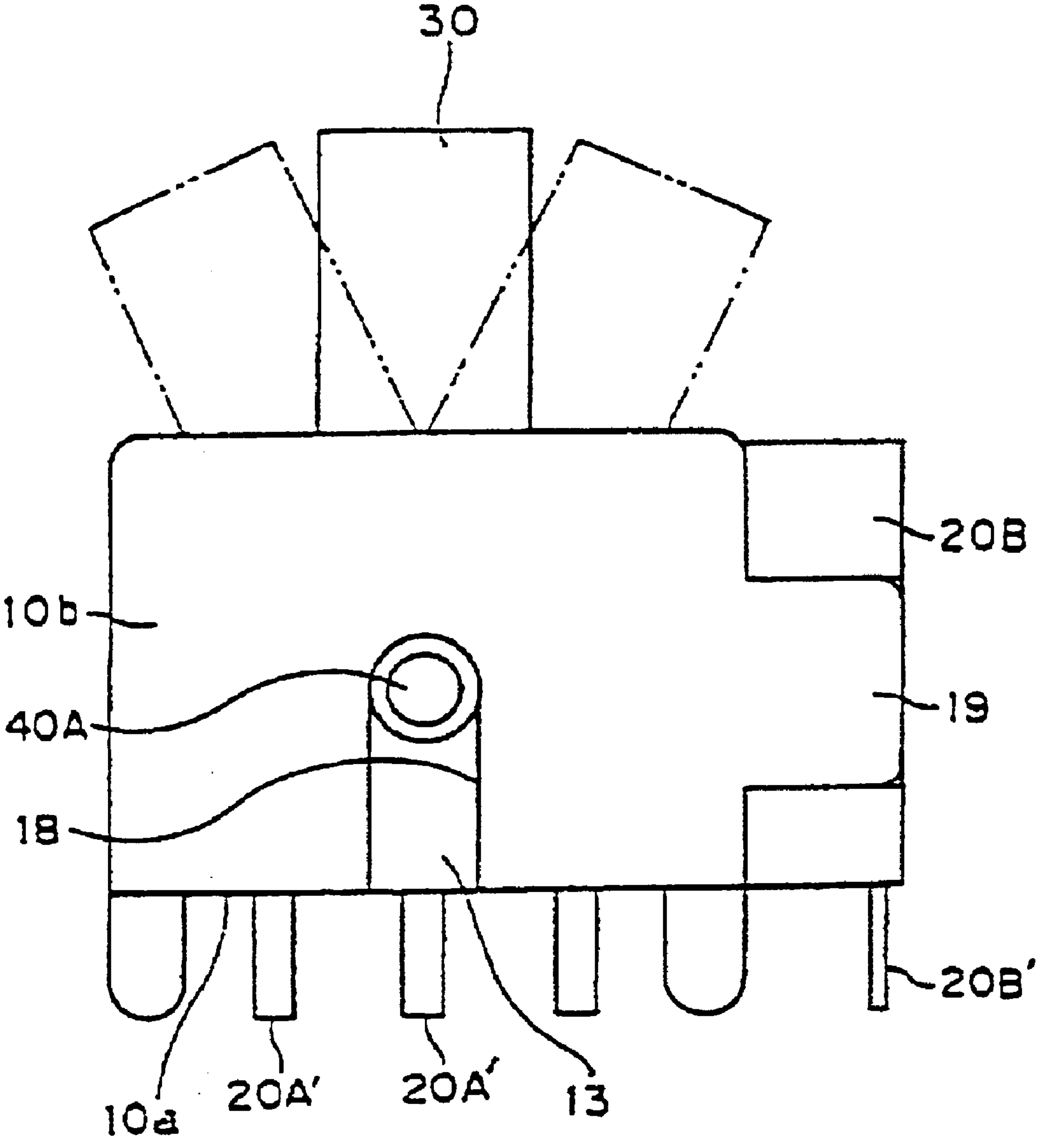
FIG. 16 is a side view of the multi-directional input apparatus.

As shown in FIGS. 14 to 16, the multi-directional input apparatus of the fifth embodiment of the invention comprises the box-like case 10 disposed on the board, and signal output means 20A and 20B mounted to two crossing side surfaces of the case 10. The signal output means 20A and 20B are volumes (variable resistors) which are electrical sensors. The signal output means 20A and 20B include a plurality of terminals 20A' and 20B' projecting downward.

Figure 17:
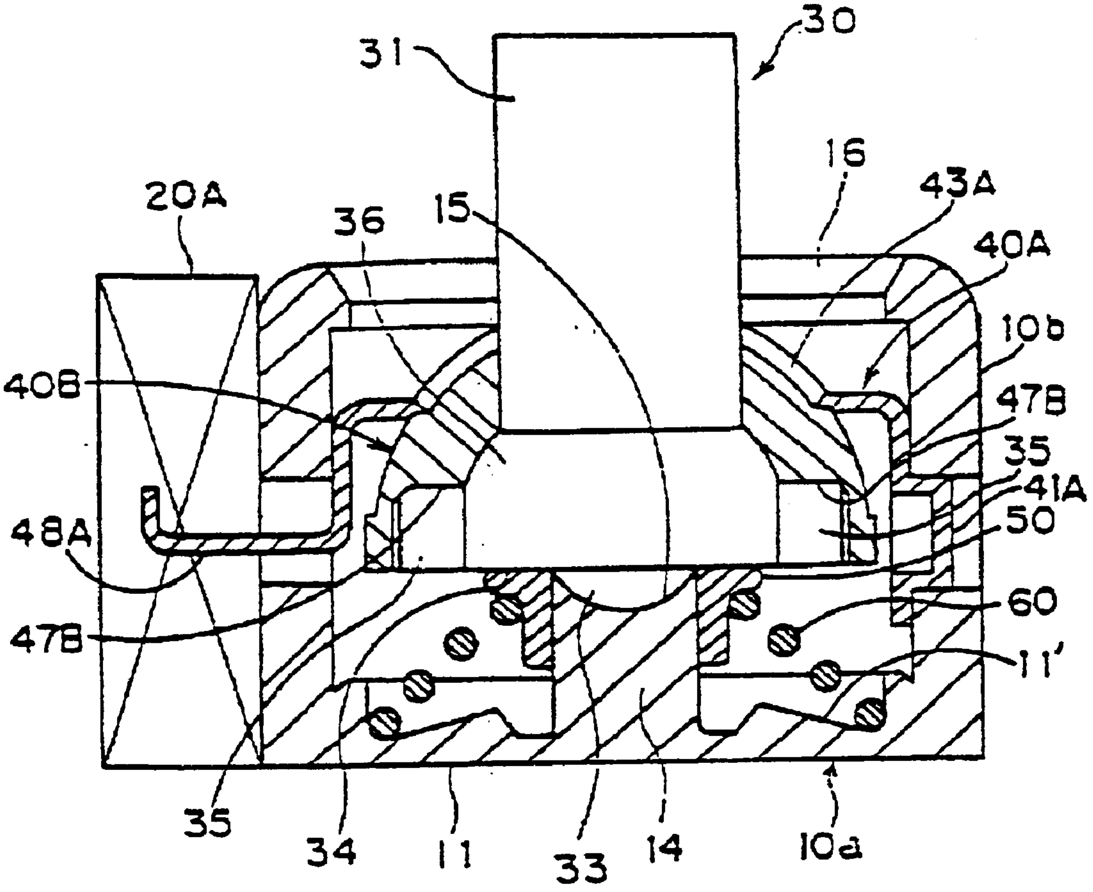
FIG. 17 is a sectional view taken along a J—J line in FIG. 14.
Figure 18:
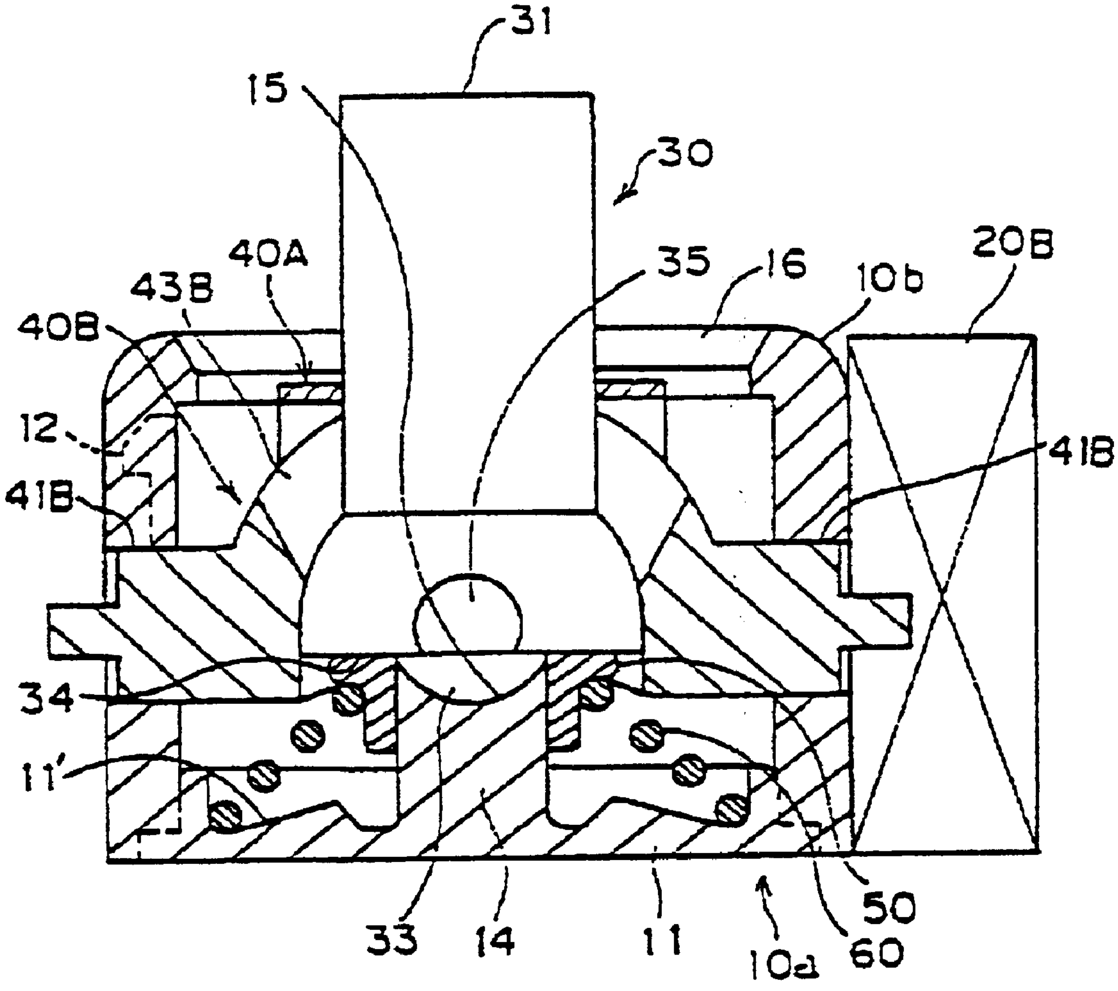
FIG. 18 is a sectional view taken along a K—K line in FIG. 14.

As shown in FIGS. 17 and 18, accommodated in the case 10 are rod-like operating member 30 operated in an arbitrary direction therearound, the set of upper and lower turning members 40A and 40B operated by the operating member 30, the slider 50 as the returning mechanism for automatically returning the operating member 30 to the neutral position, and the spring 60.

Structures of the case 10, the operating member 30, the turning members 40A and 40B, the slider 50 and the spring 60 will be explained in detail below.

The case 10 is of a two-piece structure comprising a combination of a lower case 10*a* forming a bottom plate of the case 10 and an upper case 10*b* fitted to the lower case 10*a* from above. The lower case 10*a* has a rectangular bottom plate 11. The bottom plate 11 is formed at its upper surface with a circular recess 11' for positioning the spring 60, and the recess 11' is formed at its center with the boss 14 projecting upward. The boss 14 is of a columnar shape having a circular cross section. The boss 14 supports the operating member 30 and the slider 50. An upper end surface of the boss 14 is formed into a downwardly swelling semi-spherical recess 15.

Two parallel sides of the bottom plate 11 are provided with pawls 12 upwardly projecting for securing the lower case 10*a* to the upper case 10*b*. A central portion of each side of the bottom plate 11 is provided with the support 13 projecting upward for supporting the turning members 40A and 40B.

The upper case 10*b* to be put on the lower case 10*a* is a box-like cap whose lower surface is opened. A ceiling of the upper case 10*b* is provided with an opening 16 through which an upper portion of the operating member 30 projects upward. Two parallel side walls of the lowercase 10*a* are provided with notched fitting portions 17 with which the pawls 12 are engaged. Each the side wall is provided with a notch 18 to which the support 13 is fitted. The intersecting two side walls are provided with a pair of pawls 19 on the opposite sides for securing the signal output means 20A and 20B.

When the upper case 10*b* is put on the lower case 10*a*, the pawls 12 of the lower case 10*a* are fitted to the fitting portions 17 of the upper case 10*b*, thereby securing the lower case 10*a* to the upper case 10*b*. When the supports 13 of the lower case 10*a* are fitted to the notches 18 of the upper case 10*b*, the opposite end supporting portions for the turning members 40A and 40B are formed. The signal output means 20A and 20B are secured to the two crossing side surfaces of the case 10 by means of the pawls 19.

The operating member 30 comprises an upwardly swelling semi-spherical portion 36 which is rotatably fitted to the lower turning member 40B, a shaft 31 having a circular cross section and projecting from an upper portion of the semi-spherical portion 36 upwardly, and a pair of turning shafts 35 and 35 projecting sideway from opposite sides of the semi-spherical portion 36. A lower surface of the shaft 31 except its central portion is a circular and annular flat surface 34 perpendicular to a center axis thereof. A central portion of the lower surface of the shaft 31 is provided with a downwardly swelling semi-spherical projection 33. The projections 33 are fitted to the semi-spherical recess 15 formed on the upper end surface of the boss 14 of the lowercase 10*a*. Each of the pair of opposite turning shafts 35 and 35 is of substantially columnar shape whose lower portion of the horizontal columnar is removed. A lower surface of the turning shaft 35 is a flat surface which is continuously formed with the flat surface 34.

Figure 19:
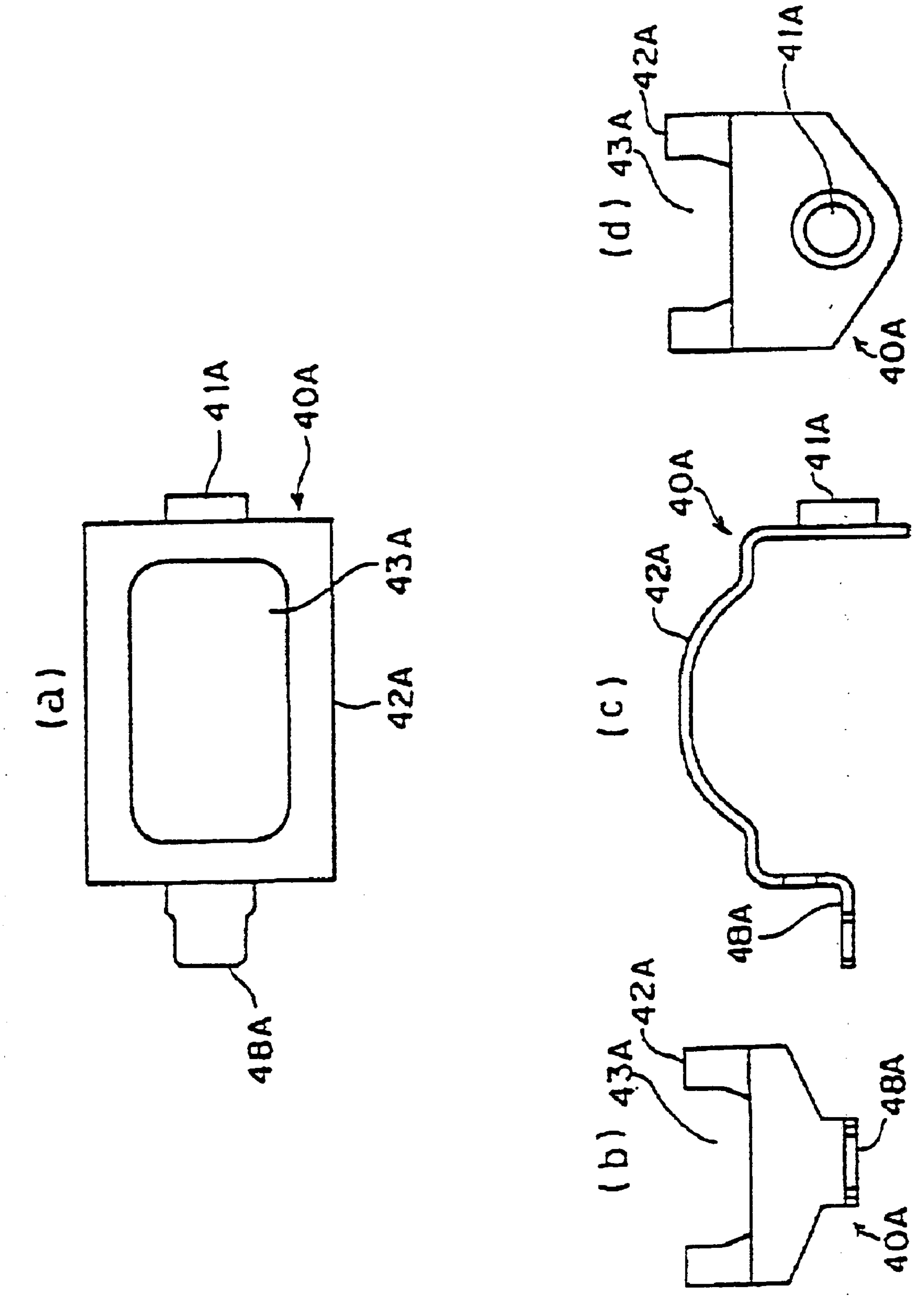
FIG. 19 show an upper turning member used in the multi-directional input apparatus, wherein FIG. 19(*a*) is a plan view, FIG. 19(*b*) is a left side view, FIG. 19(*c*) is a front view and FIG. 19(*d*) is a right side view.

As shown in FIG. 19, the upper turning member 40A is a metal plate which is integrally formed by bending unlike the other members. One end of the turning member 40A is provided with a turning shaft 41A. The other end is provided with a connecting portion 48A to be connected to the signal output means 20A. An upwardly swelling arc 42A is provided between the turning shafts 41A and 41A and the connection portion 48A. The arc 42A is provided with a long hole 43A extending in a direction of the turning center axis as a guide hole for the operating member 30.

Figure 20:
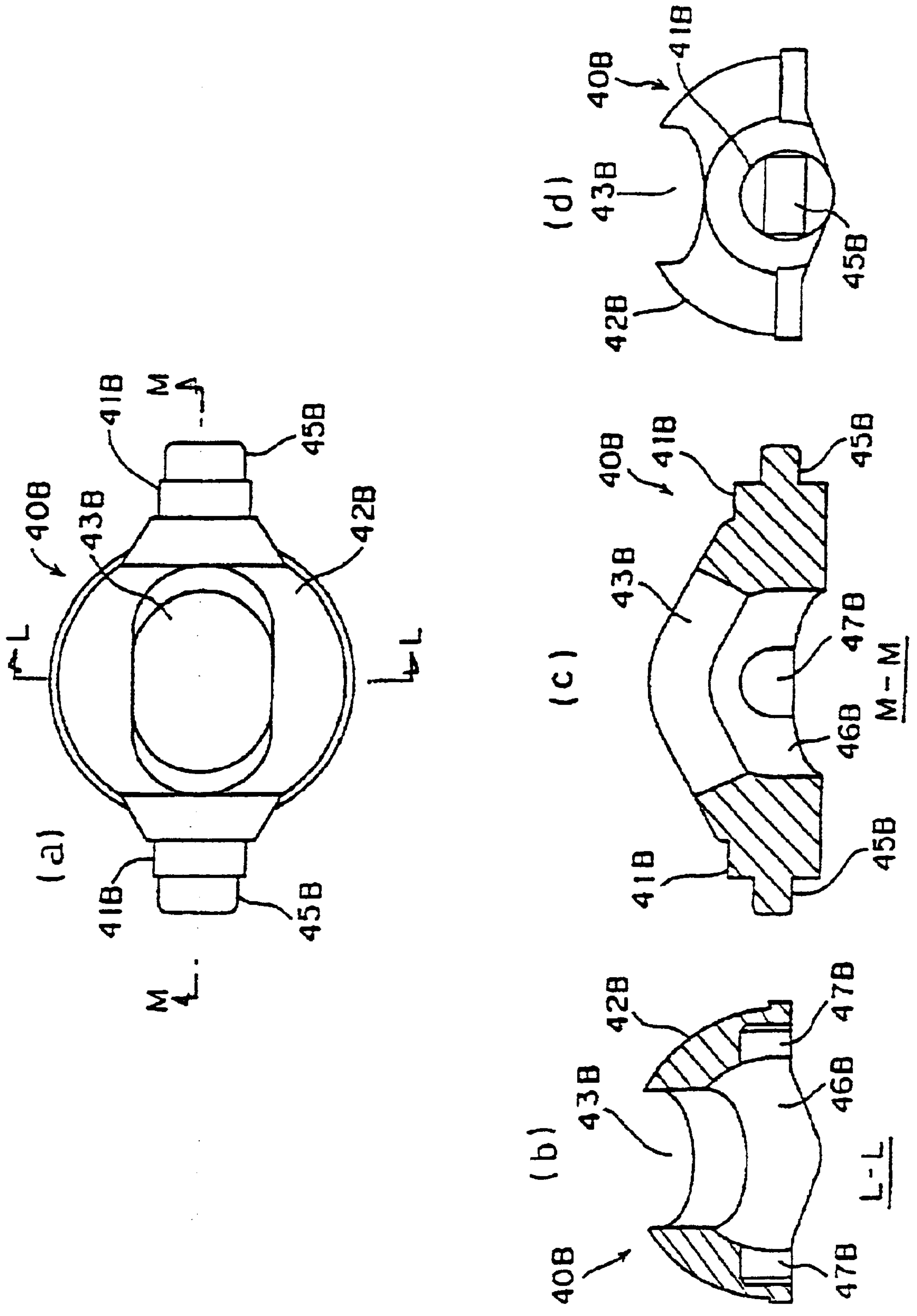
FIG. 20 show a lower turning member used in the multi-directional input apparatus, wherein FIG. 20(*a*) is a plan view, FIG. 20(*b*) is a sectional view taken along a line L—L in FIG. 20(*a*), FIG. 20(*c*) is a sectional view taken along a line M—M in FIG. 20(*a*) and FIG. 20(*d*) is a right side view.

As shown in FIG. 20, the lower turning member 40B is provided at its opposite ends with turning shafts 41B and 41B, and an upwardly swelling semi-spherical portion 42B formed between the turning shafts 41B and 41B. The semi-spherical portion 42B is provided with a long hole 43B extending in a direction of the turning center axis as a guide hole for the operating member 30. The semi-spherical portion 42B is provided at its lower surface with a semi-spherical recess 46B into which the semi-spherical portion 36 of the operating member 30 is fitted. A pair of bearings 47B and 47B are provided such as to sandwich the recess 46B. The turning shafts 35 and 35 of the operating member 30 are fitted to the bearings 47B and 47B from below.

As shown in FIGS. 17 and 18., the set of upper and lower turning members 40A and 40B are incorporated in the case 10 in a state in which their turning center axes are intersecting on the same plane, and are turnably supported in the case 10. The shafts 31 of the operating member 30 are inserted through the long holes 43A and 43B of the turning members 40A and 40B, the semi-spherical portion 36 is fitted into the recess 46B of the lower turning member 40B, and the turning shafts 35 and 35 are fitted to the bearings 47B and 47B. In this state, the operating member 30 is incorporated in the turning members 40A and 40B in the case 10. In this state, the projection 33 of the operating member 30 is fitted into the semi-spherical recess 15 formed on the upper end surface of the boss 14 of the lower case 10*a*.

Here, the turning shafts 35 and 35 of the operating member 30 are in the same plane as the turning shafts of the turning members 40A and 40B, and are intersecting the direction of the long hole 43B of the lower turning member 40B, i.e., in the direction of the turning center axis. A direction of the long hole 43B of the lower turning member 40B, the direction of the turning center axis is intersecting a direction of the long hole 43A of the upper turning member 40A, i.e., the direction of the turning center axis. A center of the semi-spherical projection 33 formed on the lower surface of the operating member 30 is located on the turning center line of the operating member 30.

Therefore, the operating member 30 is inclined around the turning shafts 35 and 35 in a direction of the long hole 43B of the lower turning member 40B. With this arrangement, the upper turning member 40A is turned along the upper surface of the semi-spherical portion 42B of the lower turning member 40B. The operating member 30 is inclined around the turning shafts 41B and 41B of the lower turning member 40B in the direction of the long hole 43A of the upper turning member 40A. With this operation, the lower turning member 40B is turned along the lower surface of the arc 42A of the upper turning member 40A.

As shown in FIGS. 17 and 18, the slider 50 for automatically returning the operating member 30 to the neutral position is a ring which is slidably fitted over the boss 14 of the lower case 10*a*. This slider 50 is biased upward by a coil-type spring 60 compressed and accommodated between the slider 50 provided outside the boss 14 and the bottom plate 11 of the lower case 10*a*. With this arrangement, the slider 50 resiliently pushes its flat upper surface against the annular flat surface 34 formed on the lower surface of the operating member 30 to hold the operating member 30 in the neutral position. The spring 60 is of a tapered type in which its diameter is gradually reduced upward, and is positioned by the circular recess 11' formed on the upper surface of the bottom plate 11 of the lower case 10*a*.

A function of the multi-directional input apparatus having the above-described structure will be explained.

When the operating member 30 is not operated, the flat upper surface of the slider 50 comes into contact resiliently with the annular flat surface 34 formed on the lower surface of the operating member 30, and the operating member 30 is resiliently held in the neutral position directly.

When the operating member 30 is inclined into the direction of the long hole 43B of the lower turning member 40B, the upper turning member 40A is turned, and the signal output means 20A is operated, and a signal corresponding to the operation amount is output. When the operating member 30 is inclined into the direction of the long hole 44A of the upper turning member 40A, the lower turning member 40B is turned, the signal output means 20B is operated, and a signal corresponding to the operation amount is output. By combining these structure, the operating member 30 is operated into an arbitrary direction, and a signal corresponding to the direction and the amount of the operation is input to the electronic equipment which uses this multi-directional input apparatus.

The operating member 30 is integrally formed at its lower portion with the turning shafts 35 and 35. Therefore, the number of parts is reduced as compared with an operating member using pins as turning shafts, and the manufacturing cost is reduced. Further, a length of the operating member 30 is restrained as compared with one in which an intermediate portion of an operating member is supported, and it is possible to reduce the entire height of the apparatus.

The operating member 30 is directly held in the neutral position by the slider 50 which was guided by the boss 14 biased upward by the spring 60 without through the turning members 40A and 40B and thus, its mechanism is relatively small.

Further, the semi-spherical portion 36 and the turning shafts 35 and 35 of the operating member 30 are accommodated in the recess 46B of the lower turning member 40B and the bearings 47B and 47B, and the operating member 30 is positioned, and the projections 33 provided on the lower surface of the operating member 30 is fitted to the semi-spherical recess 15 formed on the upper end surface of the boss 14 of the lower case 10*a*. Therefore, the operating member 30 is reliably prevented from moving downward, and the turning center position of the operating member 30 is reliably determined and fixed. In this embodiment also, it is possible to form a recess on a lower surface of the operating member 30 and to form a projection on an upper end surface of the boss 14.

As described above, the boss 14 of the lower case 10*a* serves not only as the guide member for the slider 50 but also as a stopper and a center position determining member for the operating member 30. Therefore, although the structure is of multifunctional, the structure is simplified.

The spring 60 is tapered toward upward, i.e., and a diameter thereof is gradually reduced upward. Therefore, although the coil spring is accommodated in the space whose height below the turning members 40A and 40B is limited, a sufficient biasing force is ensured, and this also contribute the reduction of the entire height of the apparatus.

As described above, the multi-directional input apparatus of the fifth embodiment of the invention is small in size and its entire height is low but has excellent functions and is inexpensive.

Figure 21:
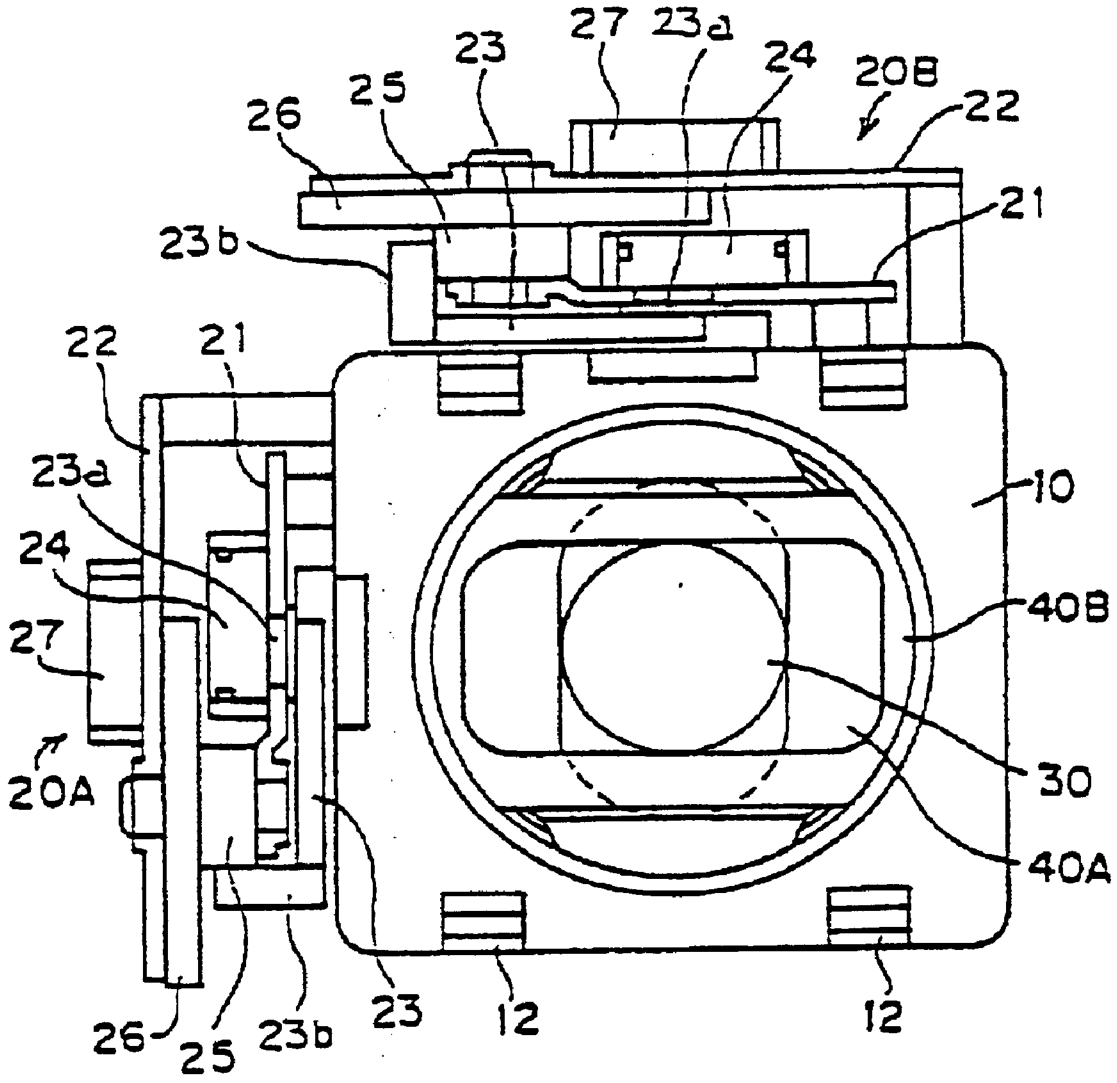
FIG. 21 is a plan view of a multi-directional input apparatus according to a sixth embodiment of the invention.
Figure 22:
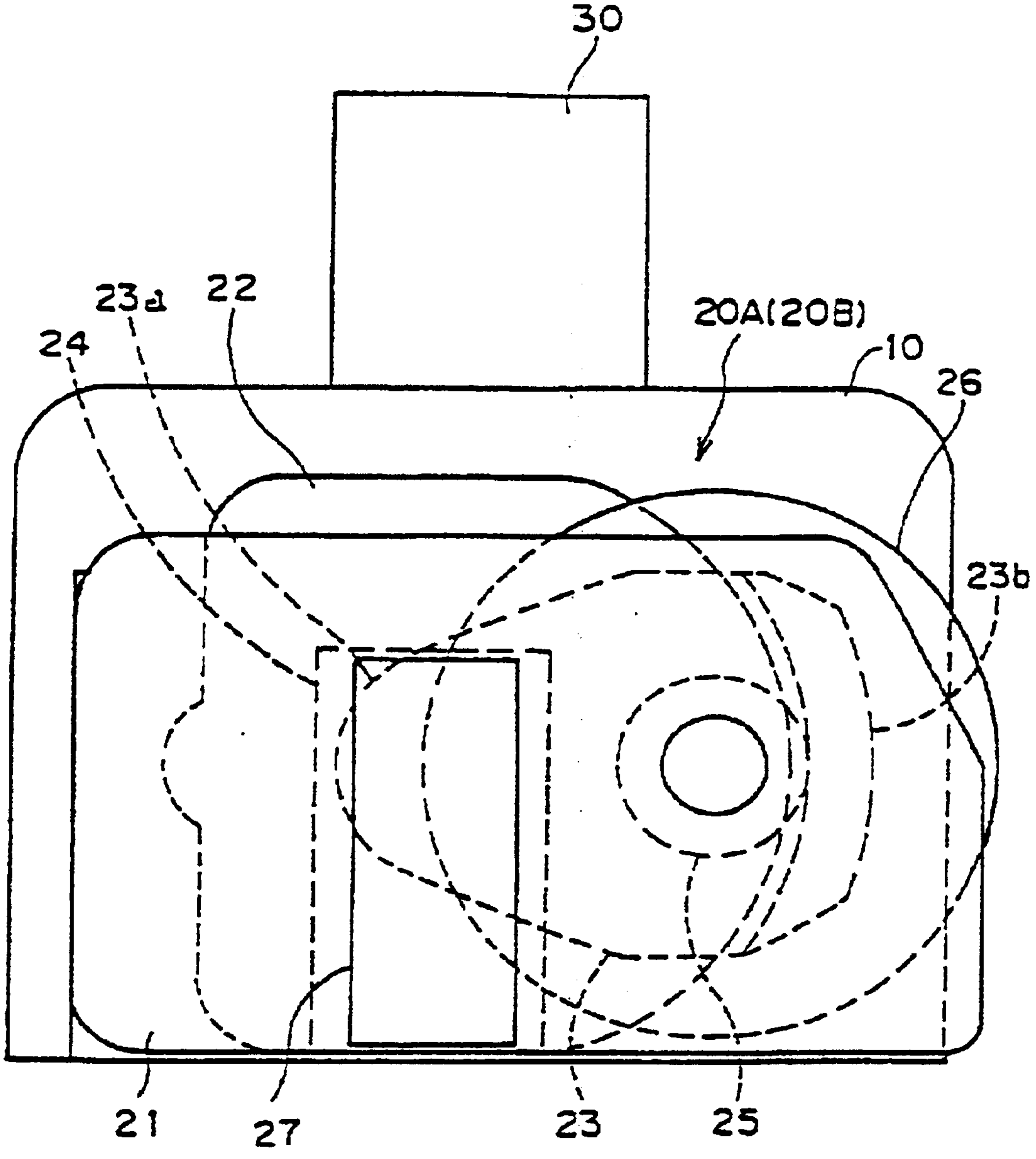
FIG. 22 is a side view of the multi-directional input apparatus.
Figure 23:
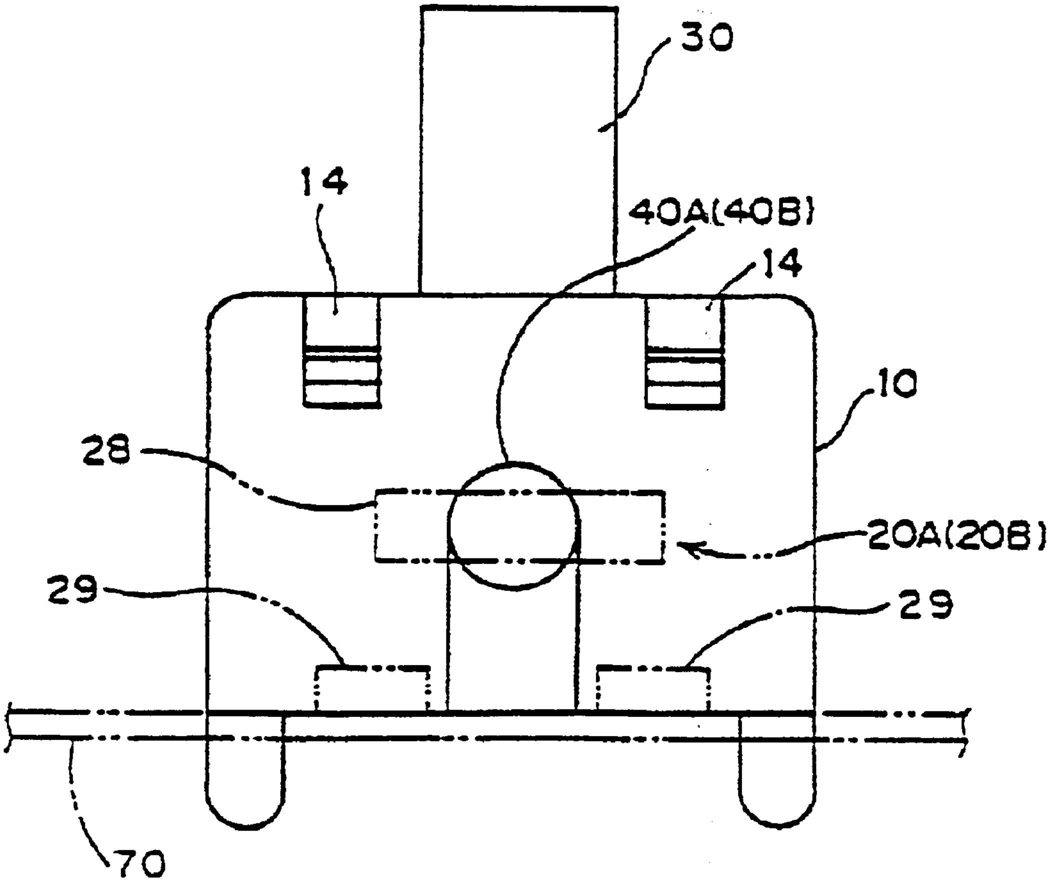
FIG. 23 is a side view of a multi-directional input apparatus of a seventh embodiment of the invention.

A multi-directional input apparatus of a sixth embodiment will be explained with reference to FIGS. 21 and 22.

This apparatus is different from the above-described multi-directional input apparatus of the fifth embodiment in the signal output means 20A and 20B. Other portion is substantially the same.

The signal output means 20A and 20B used in the apparatus are optical sensors (photo sensors). Each signal output means includes two support plates 21 and 22 mounted on a side surface of the case 10 at a predetermined distance from each other. The inner support plate 21 is provided at its back side with a fan-like gear plate 23. A rotation shaft 23*a* formed on a base of the gear plate 23 is turnably mounted to aback surface of the support plate 21 and connected to one of the turning members 40A and 40B in the case 10. A photo IC 24 is mounted to a front surface of the support plate 21.

An outer gear 25 and a slit disc 26 integrally and coaxially connected to each other are disposed between the support plates 21 and 22. The outer gear 25 and the slit disc 26 are turnably mounted to a back surface of the outer support plate 22, and the outer gear 25 meshes with an inner gear 23*b* of the gear plate 23. The slit disc 26 is formed at its outer periphery with a large number of slits in the circumferential direction at equal distances from one another. An LED 27 as a luminous element combined with the photo IC 24 is mounted to a surface of the outer support plate 22. The LED 27 is opposed to the photo IC 24 through an opening provided in the support plate 22 and an outer periphery of the slit disc 26.

If the turning members 40A and 40B in the case 10 are turned, the gear plate 23 connected to each of them is also turned so that the outer gear 25 and the slit disc 26 are rotated, and the direction and the amount of the operation of the operating member 30 is optically detected.

A multi-directional input apparatus of a seventh embodiment of the present invention will be explained with reference to FIG. 17.

This apparatus is different from the multi-directional input apparatuses of the fifth and sixth embodiments in the signal output means 20A and 20B, and the other structure is substantially the same.

The signal output means 20A and 20B used in the multi-directional input apparatus of the seventh embodiment are magnetic sensors. Each signal output means comprises a magnet 28 connected to the turning members 40A and 40B in the case 10, and a pair of Hall elements 29 and 29 combined with the magnet 28. The Hall elements 29 and 29 are mounted on a board 70 on which the multi-directional input apparatus is mounted. When the turning members 40A and 40B are turned, the magnet 28 is turned, and the output balance of the Hall elements 29 and 29 is changed.

With this arrangement, the direction and the amount of operation of the operating member 30 is magnetically detected.

The signal output means used in the multi-directional input apparatus of the present invention may be any of electric sensors, optical sensors and magnetic sensors, and the kind thereof is not limited.

As explained above, according to the multi-directional input apparatus of the invention, the operating member is integrally provided at its lower portion with a turning shaft which is perpendicular to the operating member at right angles and/or a turning-type coming-out preventing portion comprising an upwardly swelling semi-spherical portion, and a recess into which the coming-out preventing portion is turnably fitted is provided in a lower surface of the lower turning members. Therefore, the number of parts can be reduced. Further, the apparatus can be reduced in size including the height.

According to the other multi-directional input apparatus of the invention, in order to automatically return the operating member to the neutral position, the operating member and/or the set of upper and lower turning members are resiliently held in the neutral position, and when both the operating member and the turning members are resiliently held in the neutral position, the precision for returning the operating member to the neutral position can be improved.

According to another multi-directional input apparatus of the invention, a combination of a spring compressed and accommodated in the case, and a slider biased by the spring is used as the returning mechanism. Therefore, the precision for returning the operating member to the neutral position can be improved. When both the operating member and the turning members are resiliently held in the neutral position, if the slider is brought into abutment astride the operating member and the turning members, the structure can be simplified.

According to another multi-directional input apparatus of the invention, the slider resiliently abuts from below against a flat surface downwardly formed on a lower portion of the operating member and/or flat surfaces downwardly formed on opposite end shafts of the set of upper and lower turning members. Therefore, the precision for returning the operating member to the neutral position can be improved with the simple structure.

According to another multi-directional input apparatus of the invention, the case is provided at its bottom plate with a boss directing upward, the lower portion of the operating member is supported by the boss such that the operating member can be turned in an arbitrary direction therearound. Therefore, the operating member can reliably be supported.

According to another multi-directional input apparatus of the invention, the boss is provided at its upper surface with a downwardly swelling semi-spherical recess, and the operating member is provided at its lower surface with a downwardly swelling semi-spherical projection which fits into the recess. Therefore, it is possible to prevent the apparatus from being enlarged and to reliably support the operating member.

According to another multi-directional input apparatus of the invention, the boss is provided at its upper surface with an upwardly swelling semi-spherical projection, and the operating member is provided at is lower surface with an upwardly swelling semi-spherical recess into which the projection is fitted. Therefore, it is possible to prevent the apparatus from being enlarged and to reliably support the operating member.

According to another multi-directional input apparatus of the invention, since the boss also serves as a guide for the slider, even when a small slider is used, the slider can be reliably supported.

According to another multi-directional input apparatus of the invention, the operating member is biased upward by the returning mechanism and a push switch which is pushed down by the operating member is disposed below the operating member. Therefore, the function can be enhanced.

According to another multi-directional input apparatus of the invention, an upwardly swelling substantially semi-circular turning shaft is disposed as a coming-out preventing portion below a shaft of the operating member. Turning members the height of the apparatus can effectively be restrained.

According to another multi-directional input apparatus of the invention, an upwardly swelling substantially semi-circular disc is disposed below a shaft of the operating member, and a lower surface of the disc is a downward flat surface against which the slider abuts. Therefore, even if the coming-out preventing portion is of substantially semi-circular shape, the operating member can reliably be returned to the neutral position automatically.

According to another multi-directional input apparatus of the invention, the lower turning member is provided at its lower surface with a recess into which the disc is turnably fitted, and a pair of bearings are provided on an inner surface of the recess as a recess into which the turning shaft is fitted. Therefore, increase in height of the apparatus caused by providing the disc can be avoided.

According to another multi-directional input apparatus of the invention, since a pair of turning shafts projecting into opposite sides are provided as the coming-out preventing portions for the operating member, the operating member can be prevented from rotating around its axis which is a problem when the semi-spherical is provided. The turning shafts are projected from the lower portion of the operating member, and especially from opposite sides of the flat surface against which the slider abuts. Therefore, the turning members are located at the lowermost end of the operating member, and increase in height of the apparatus caused by providing the turning shafts can be avoided.

According to another multi-directional input apparatus of the invention, the lower turning member is provided at its lower surface with a pair of bearings as recesses into which the pair of turning shafts are turnably fitted. Therefore, increase in height of the apparatus caused by providing the turning shafts can be avoided.

INDUSTRIAL APPLICABILITY

The present invention can be utilized as an input device of a personal computer, a game machine and the like.

What is claimed is:

1. A multi-directional input apparatus comprising a set of upper and lower turning members supported in said case such that said tuning members can turn into two intersecting directions and each having a long hole extending in a direction perpendicular to said turning direction;

an operating member passing through each of said long holes of said set of upper and lower turning members, said operating member turning each of said turning members when said operating member is operated in arbitrary direction therearound;

a returning mechanism for returning said operating member from a position when said operating member is operated in the arbitrary direction therearound to a neutral position; and set of signal output means connected to ends of said set of upper and lower turning members for outputting signal corresponding to a turning angle of each of said turning members; wherein said operating member is integrally provided at its lower portion with a turning shaft which is perpendicular to said operating member at right angles and/or a turning-type coming-out preventing portion comprising an upwardly swelling semi-spherical portion, and a recess into which said coming-out preventing portion is turnably fitted is provided in a lower surface of the lower turning members, wherein said returning mechanism comprises a spring compressed and accommodated in said cases, and a slider biased by said spring, wherein said slider resiliently abuts from below against a flat surface downwardly formed on a lower portion of said operating member and flat surfaces downwardly formed on opposite end shafts of said set of upper and lower turning members.

2. The multi-directional input apparatus according to claim 1, wherein said returning mechanism resiliently holds said operating member and/or said set of upper and lower turning members in the neutral position.

3. The multi-directional input apparatus according to claim 1, wherein said case is provided at its bottom plate with a boss directing upward, the lower portion of said operating member is supported by said boss such that said operating member can be turned in an arbitrary direction thereareound.

4. The multi-directional input apparatus according to claim 3, wherein said boss is provided at its upper surface with a downwardly swelling semi-spherical recess, and said operating member is provided at its lower surface with a downwardly swelling semi-spherical projection which fits into said recess.

5. The multi-directional input apparatus according to claim 3, wherein said boss is provided at its upper surface with an upwardly swelling semi-spherical projection, and said operating member is provided at its lower surface with an upwardly swelling semi-spherical recess into which said projection is fitted.

6. The multi-directional input apparatus according to any one of claims 3 to 5, wherein said boss also serves as a guide for said slider.

7. The multi-directional input apparatus according to claim 1, wherein said operating member is biased upward by said returning mechanism, and a push switch which is pushed down by said operating member is disposed below said operating member.

8. The multi-directional input apparatus according to claim 1, wherein an upwardly swelling substantially semi-circular turning shaft is disposed as a coming-out preventing portion below a shaft of said operating member.

9. The multi-directional input apparatus according to claim 8, wherein an upwardly swelling substantially semi-circular disc is disposed below a shaft of said operating member, and a lower surface of said disc is a downward flat surface against which said slider abuts.

10. The multi-directional input apparatus according to claim 9, wherein said lower turning member is provided at its lower surface with a recess into which said disc is tunably fitted, and a pair of bearings are provided on an inner surface of said recess as a recess into which said turning shaft is fitted.

11. The multi-directional input apparatus according to claim 1, wherein said operating member is provided at its lower portion with a downward flat surface against which said slider abuts, and said operating member includes a pair of substantially columnar turning shafts as coming-out preventing portions projecting from opposite sides of said flat surface.

12. The multi-directional input apparatus according to claim 11, wherein said lower turning member is provided at iis lower surface with a pair of bearings as recesses into which said pair of turning shaft are tunably fitted.

13. The multi-directional input apparatus according to claim 1, wherein said set of signal input means are any of electric sensors, optical sensors and magnetic sensors.

* * * * *